United States Patent
Carlson

(10) Patent No.: US 10,144,273 B2
(45) Date of Patent: Dec. 4, 2018

(54) REMOVABLE VEHICLE PANEL SYSTEM

(71) Applicant: Paul M. Carlson, Grand Forks, ND (US)

(72) Inventor: Paul M. Carlson, Grand Forks, ND (US)

( * ) Notice: Subject to any disclaimer, the term of this patent is extended or adjusted under 35 U.S.C. 154(b) by 41 days.

(21) Appl. No.: 15/387,134

(22) Filed: Dec. 21, 2016

(65) Prior Publication Data

US 2018/0170455 A1    Jun. 21, 2018

(51) Int. Cl.
| | | |
|---|---|---|
| *B60N 99/00* | (2006.01) | |
| *B60J 1/18* | (2006.01) | |
| *B62D 33/06* | (2006.01) | |
| *B60J 7/11* | (2006.01) | |
| *B60J 7/19* | (2006.01) | |
| *B60J 5/04* | (2006.01) | |
| *B60J 1/02* | (2006.01) | |

(52) U.S. Cl.
CPC .............. *B60J 1/18* (2013.01); *B60J 1/025* (2013.01); *B60J 5/0486* (2013.01); *B60J 7/11* (2013.01); *B60J 7/194* (2013.01); *B62D 33/0625* (2013.01); *B60Y 2306/09* (2013.01)

(58) Field of Classification Search
CPC ............ B62D 33/0621; B62D 33/0604; B62D 33/0625; B60J 1/025; B60J 1/18; B60J 5/0486; B60J 7/11; B60J 7/194; B60Y 2306/09
See application file for complete search history.

(56) References Cited

U.S. PATENT DOCUMENTS

| | | | |
|---|---|---|---|
| 2,997,333 A | | 8/1961 | Kauffman |
| 4,632,448 A | | 12/1986 | Yagasaki |
| 5,094,313 A | * | 3/1992 | Mauws ................ B62D 21/08 180/210 |
| 5,203,601 A | * | 4/1993 | Guillot .................. B60J 5/0487 296/102 |
| 5,286,081 A | * | 2/1994 | Martin, Jr. ......... B62D 33/0621 180/89.12 |
| 5,297,844 A | | 3/1994 | Haustein |
| 6,149,228 A | * | 11/2000 | O'Neill ................. B60R 21/131 296/190.01 |
| 6,189,954 B1 | | 2/2001 | Martin, Jr. |
| 6,206,446 B1 | | 3/2001 | Slayden |
| 6,293,610 B1 | * | 9/2001 | Howard ................ B60J 5/0487 296/148 |
| 6,543,830 B1 | | 4/2003 | Stuck |

(Continued)

*Primary Examiner* — Lori L Lyjak
(74) *Attorney, Agent, or Firm* — Neustal Law Offices

(57) ABSTRACT

A removable panel system for easily and efficiently varying the configuration of a cabin on a vehicle. The removable panel system generally includes a vehicle having a cab defined by a frame. Different panels may be selectively and removably connected to the frame to form various different cab configurations to suit the different needs of different jobs or operators. A roof panel may be removably connected to the frame to form a roof of the cab. A rear window extension may extend from the roof panel to form the rear window of the cab. A door receiver panel and/or door panel may be removably connected to the frame to form one or more doors of the cab. A windshield panel may be removably connected to the frame to form a windshield for the cab. All panels are adapted to be easily and efficiently interchanged without undue effort from the operator.

14 Claims, 29 Drawing Sheets

(56) References Cited

U.S. PATENT DOCUMENTS

| | | | |
|---|---|---|---|
| 6,659,526 B2 | 12/2003 | Strong | |
| 7,216,926 B2 | 5/2007 | Hampel | |
| 7,396,046 B2 * | 7/2008 | Cole | B60Q 1/2661 |
| | | | 224/405 |
| 7,431,375 B1 * | 10/2008 | Julius | B60J 11/06 |
| | | | 150/168 |
| 7,503,607 B2 | 3/2009 | Sersland | |
| 7,845,711 B2 | 12/2010 | Orrell | |
| 9,315,219 B2 | 4/2016 | Knoblett | |
| 9,352,636 B1 * | 5/2016 | Johnson | B60J 1/20 |
| 9,688,336 B2 * | 6/2017 | Lafleur | B62J 17/00 |
| 2003/0011180 A1 * | 1/2003 | Coffman | B60R 11/00 |
| | | | 280/748 |
| 2005/0001446 A1 * | 1/2005 | Morley | B60J 1/08 |
| | | | 296/102 |
| 2008/0048429 A1 * | 2/2008 | German | B60P 3/40 |
| | | | 280/770 |
| 2015/0047917 A1 * | 2/2015 | Burt, II | B62D 25/2036 |
| | | | 180/292 |
| 2015/0076854 A1 * | 3/2015 | Salamon | B60J 1/04 |
| | | | 296/96.2 |
| 2016/0229366 A1 * | 8/2016 | Witt | B60R 21/06 |
| 2017/0368902 A1 * | 12/2017 | Rittenour | B60H 1/0045 |

* cited by examiner

REMOVABLE VEHICLE PANEL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a removable panel system for easily and efficiently varying the configuration of a cabin on a vehicle.

Related Art

Any discussion of the related art throughout the specification should in no way be considered as an admission that such related art is widely known or forms part of common general knowledge in the field.

Vehicles such as ATV's are in common use for both recreation and industry such as agriculture, landscaping, and construction. Generally, the cab on such vehicles is not interchangeable. On jobs where an operator must enter and exit the vehicle repeatedly, it would be preferable to have a removable door so that the door does not need to be opened or closed each time the operator enters or exits the cab. On jobs in hot environments, it may be desirable for the operator to remove the windows or roof to allow more airflow. Where vehicle cabs have been interchangeable, they have done so in a non-efficient manner which requires significant effort on the part of the operator to connect or disconnect panels to modify the configuration of the cab.

SUMMARY

An example embodiment of the present invention is directed to a removable panel system. The removable panel system includes a vehicle having a cab defined by a frame. A plurality of different panels may be selectively and removably connected to the frame to form various different configurations of the cab to suit the different needs of different jobs or operators. A roof panel may be removably connected to the frame to form a roof of the cab. A rear window extension may extend from the roof panel to form the rear window of the cab. A door receiver panel and/or door panel may be removably connected to the frame to form one or more doors of the cab. A windshield panel may be removably connected to the frame to form a windshield for the cab. All panels are adapted to be easily and efficiently interchanged without undue effort from the operator.

There has thus been outlined, rather broadly, some of the features of the removable panel system in order that the detailed description thereof may be better understood, and in order that the present contribution to the art may be better appreciated. There are additional features of the removable panel system that will be described hereinafter and that will form the subject matter of the claims appended hereto. In this respect, before explaining at least one embodiment of the removable panel system in detail, it is to be understood that the removable panel system is not limited in its application to the details of construction or to the arrangements of the components set forth in the following description or illustrated in the drawings. The removable panel system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
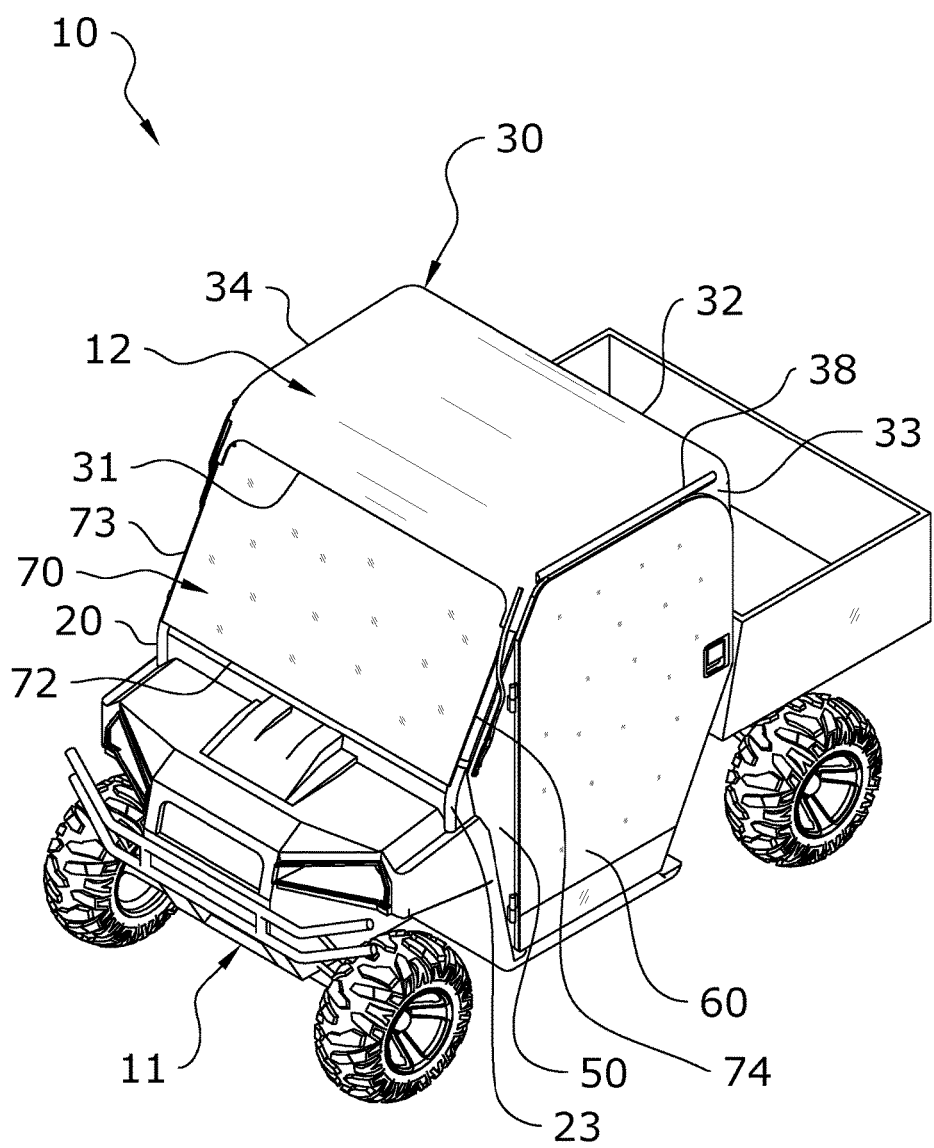
FIG. 1 is a frontal perspective view of a removable panel system with all panels installed in accordance with an example embodiment.

A. Overview.

An example removable panel system 10 generally comprises a vehicle 11 having a cab 12 defined by a frame 20. A plurality of different panels 30, 44, 50, 60, 70 may be selectively and removably connected to the frame 20 to form various different configurations of the cab 12 to suit the different needs of different jobs or operators. A roof panel 30 may be removably connected to the frame 20 to form a roof of the cab 12. A rear window extension 40 may extend from the roof panel 30 to form the rear window of the cab 12. A door receiver panel 50 and/or door panel 60 may be removably connected to the frame 20 to form one or more doors of the cab 12. A windshield panel 70 may be removably connected to the frame 20 to form a windshield for the cab 12. All panels 30, 44, 50, 60, 70 are adapted to be easily and efficiently interchanged without undue effort from the operator.

B. Frame.

The figures illustrate a vehicle 11 having a frame 20 which accommodates a plurality of removable panels 30, 50, 60, 70 that may be selectively connected to and/or disconnected from the frame 20. It should be appreciated that, while the figures illustrate a vehicle 11 comprised of an all-terrain vehicle (ATV), the invention described herein would be equally as functional with a variety of other vehicles, such as cars and the like.

As shown throughout the figures, the vehicle 11 includes a frame 20 which forms a cab 12 in which an operator may sit. By selectively installing or removing various panels 30, 50, 60, 70, the operator may have greater control over comfort while sitting in the cab 12. For example, if the operator wishes to enjoy the sun on a particularly nice day, the roof panel 30 may be removed while retaining the door panels 60 and windshield panel 70. As another example, if the operator knows that he/she will be required to enter and exit the cab 12 repeatedly during a project, the door panels 60 may be left off the cab 12 so that the operator does not have to open/close the door to enter/exit the cab 12.

Figure 10:
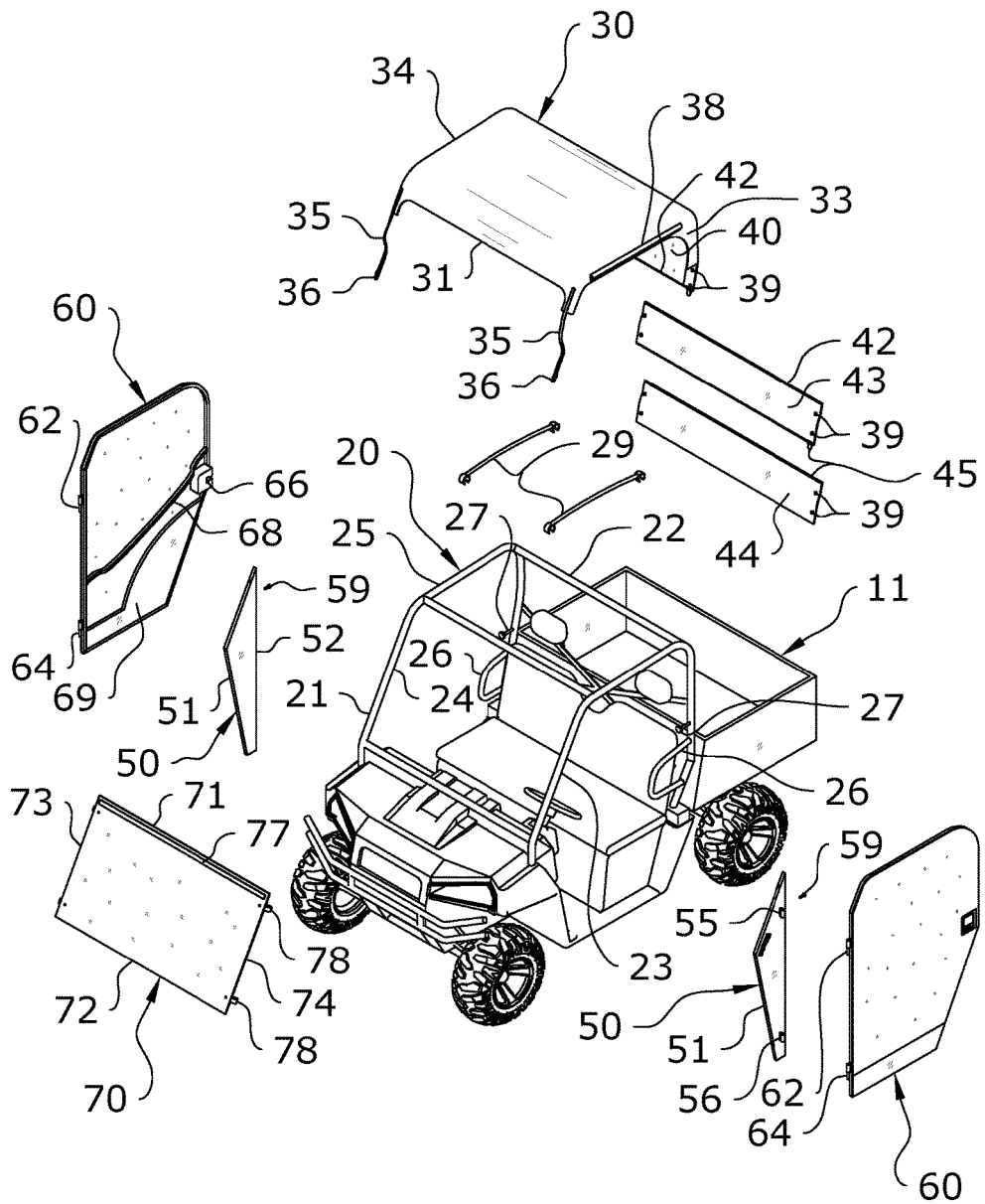
FIG. 10 is an exploded view of a removable panel system in accordance with an example embodiment.

An exemplary frame 20 is best shown in FIG. 10. This particular frame 20 is well-suited for a vehicle 11 comprising an ATV as illustrated in the exemplary figures. It should be appreciated that the size, configuration, shape, and/or orientation of the frame 20 may vary in different embodiments to suit different vehicles 11 and/or types of cabs 12.

In the exemplary embodiment shown in the figures, the frame 20 comprises a front end 21, a rear end 22, a first side 23, a second side 24, and an upper end 25. The frame 20 may comprise elongated members which may be integrally formed of a unitary structure. Alternatively, the frame 20 may comprise a plurality of interconnected members, such as by welding.

Figure 2:
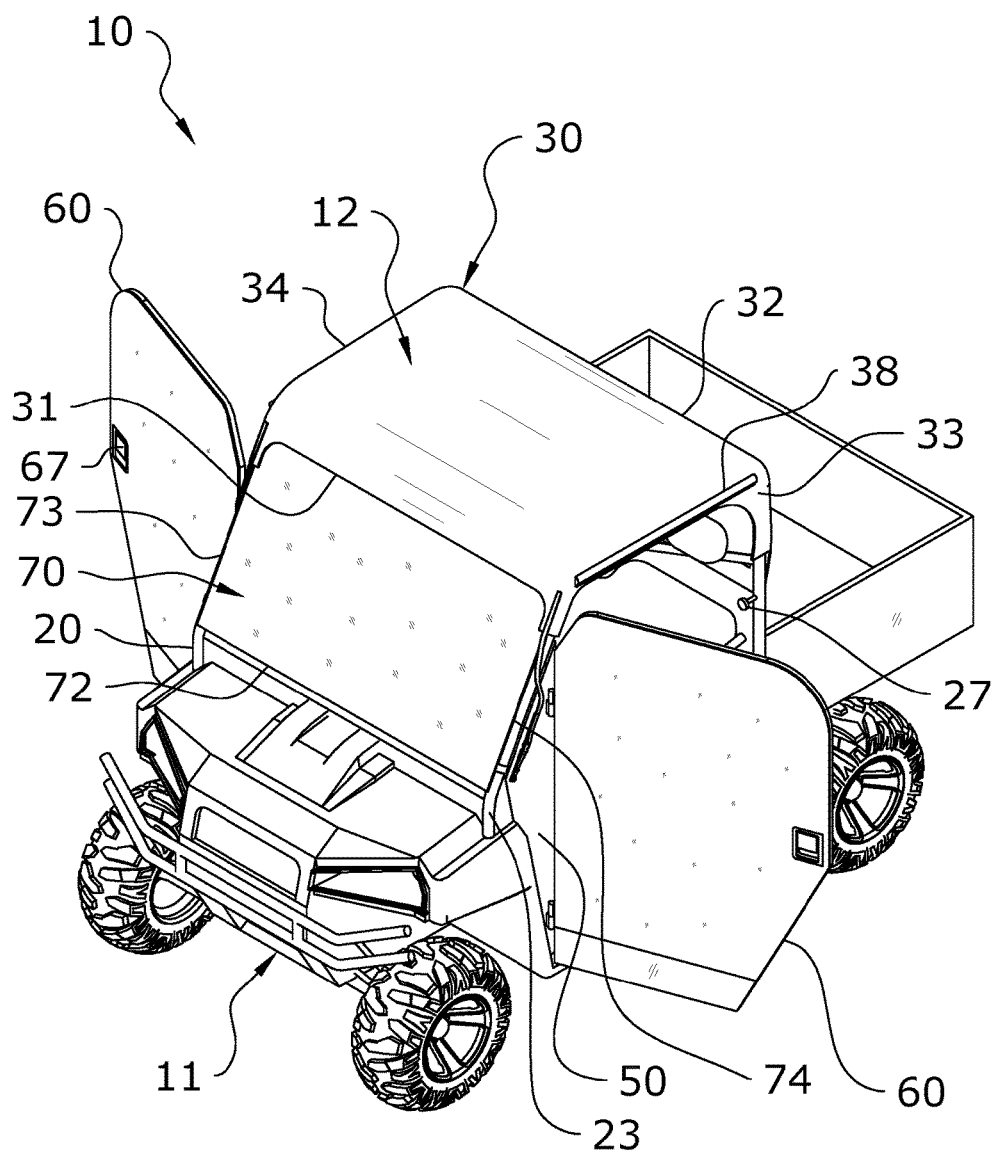
FIG. 2 is a frontal perspective view of a removable panel system with all panels installed and the door panels opened in accordance with an example embodiment.
Figure 3:
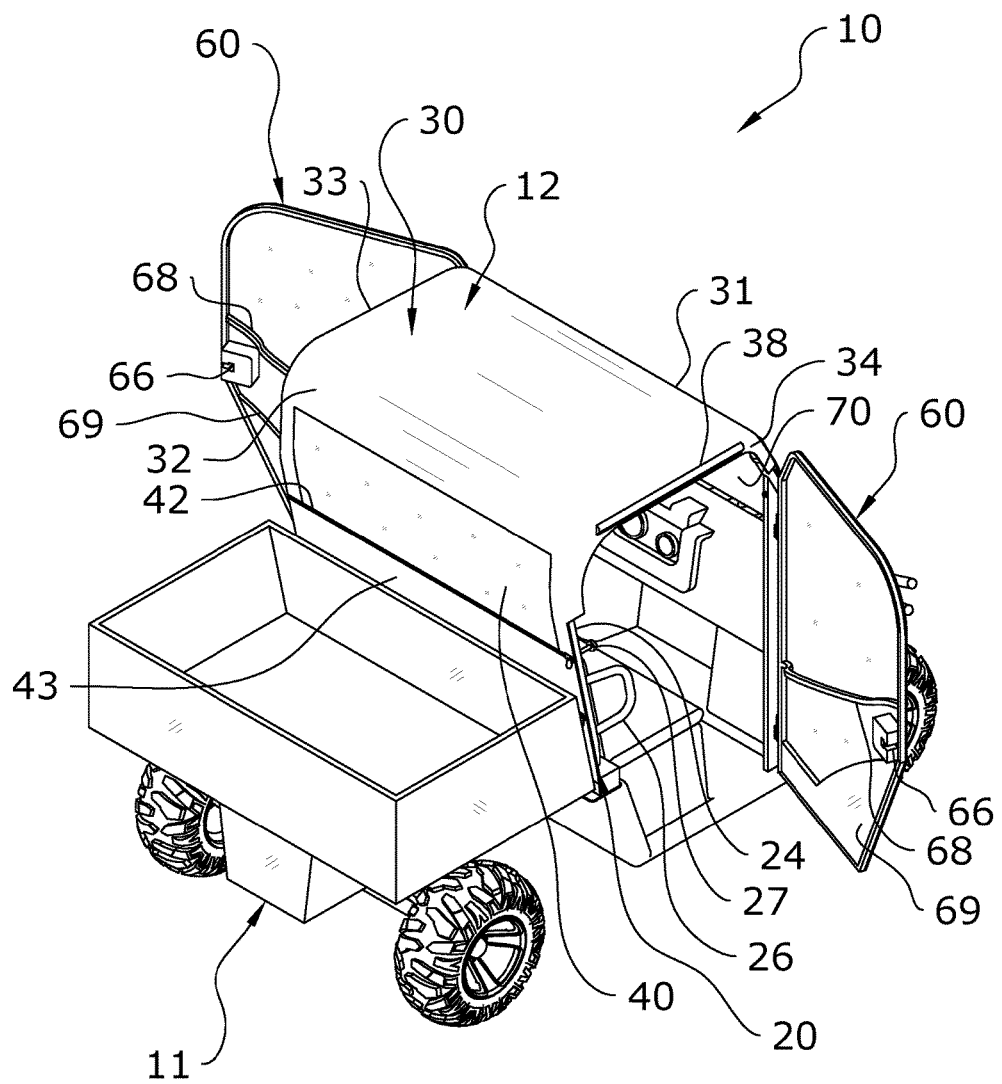
FIG. 3 is a rear perspective view of a removable panel system with all panels installed and the door panels opened in accordance with an example embodiment.
Figure 4:
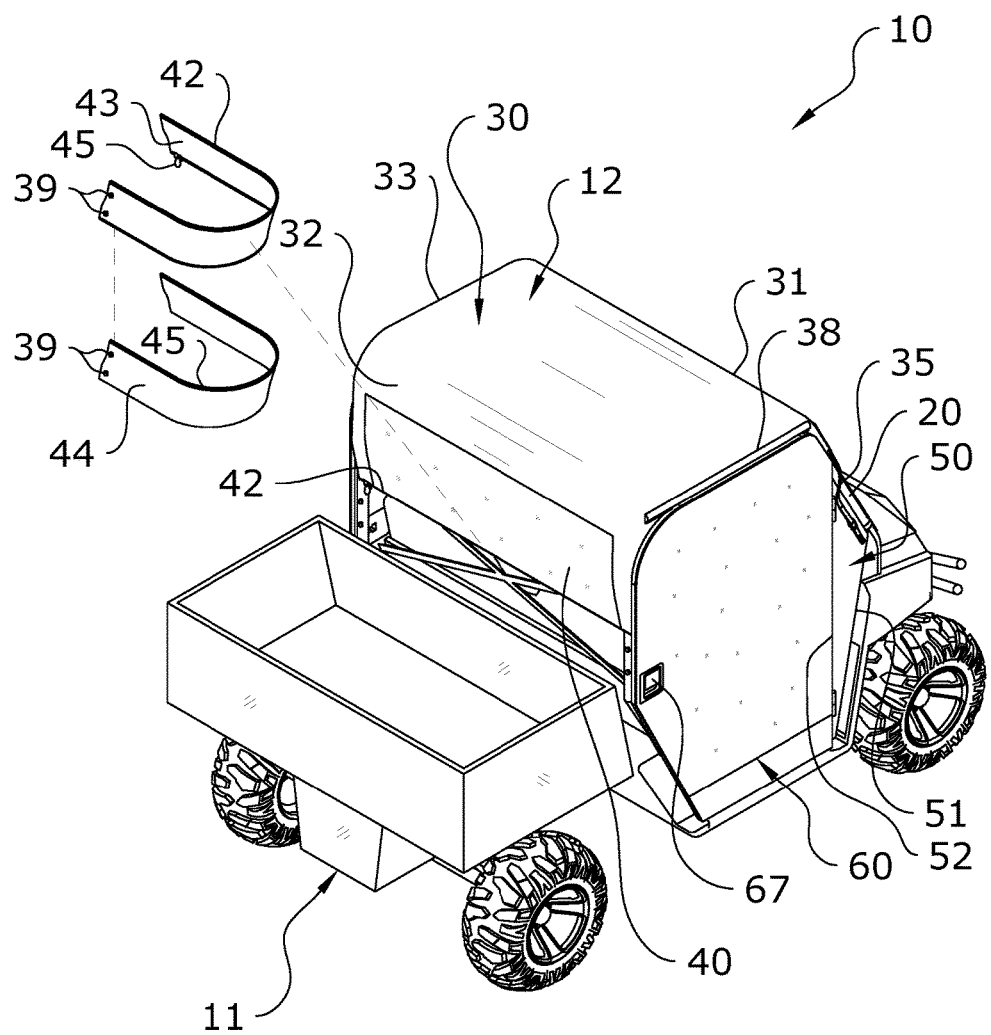
FIG. 4 is a rear perspective view of a removable panel system with the rear window panel being removed in accordance with an example embodiment.
Figure 5:
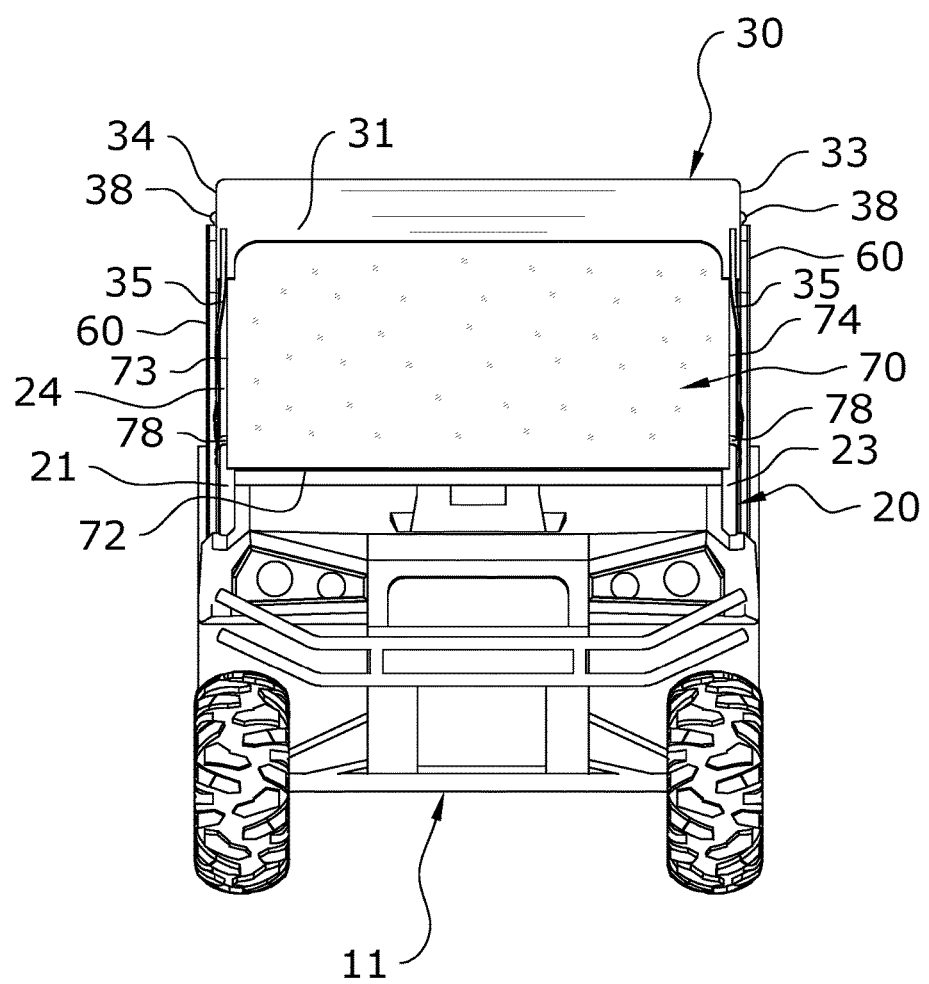
FIG. 5 is a frontal view of a removable panel system in accordance with an example embodiment.
Figure 6:
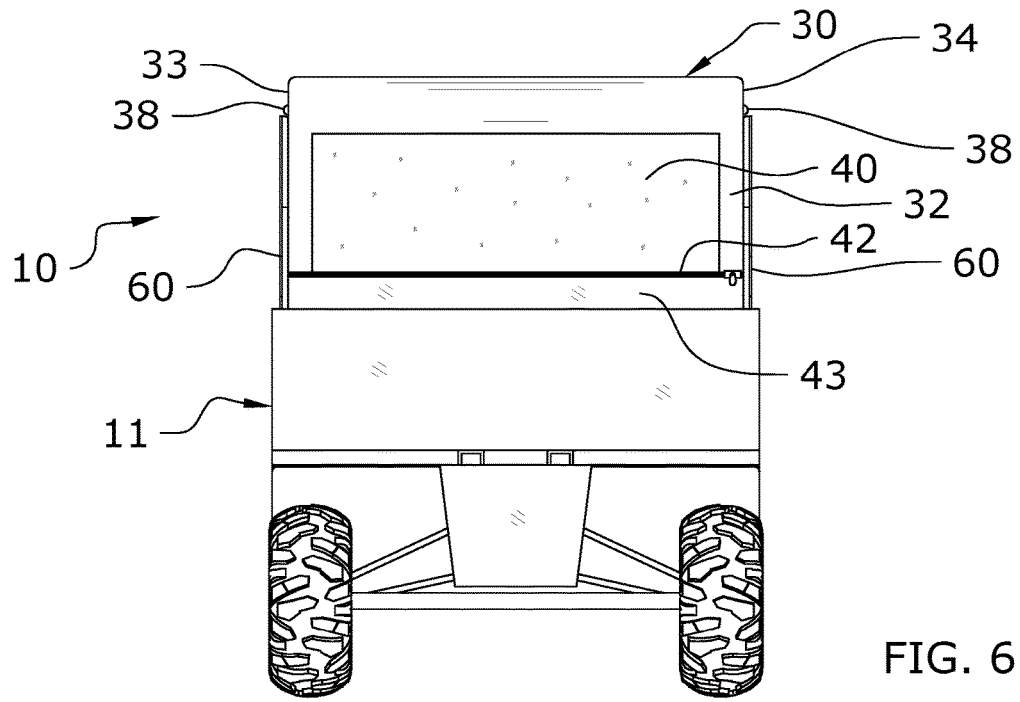
FIG. 6 is a rear view of a removable panel system in accordance with an example embodiment.
Figure 7:
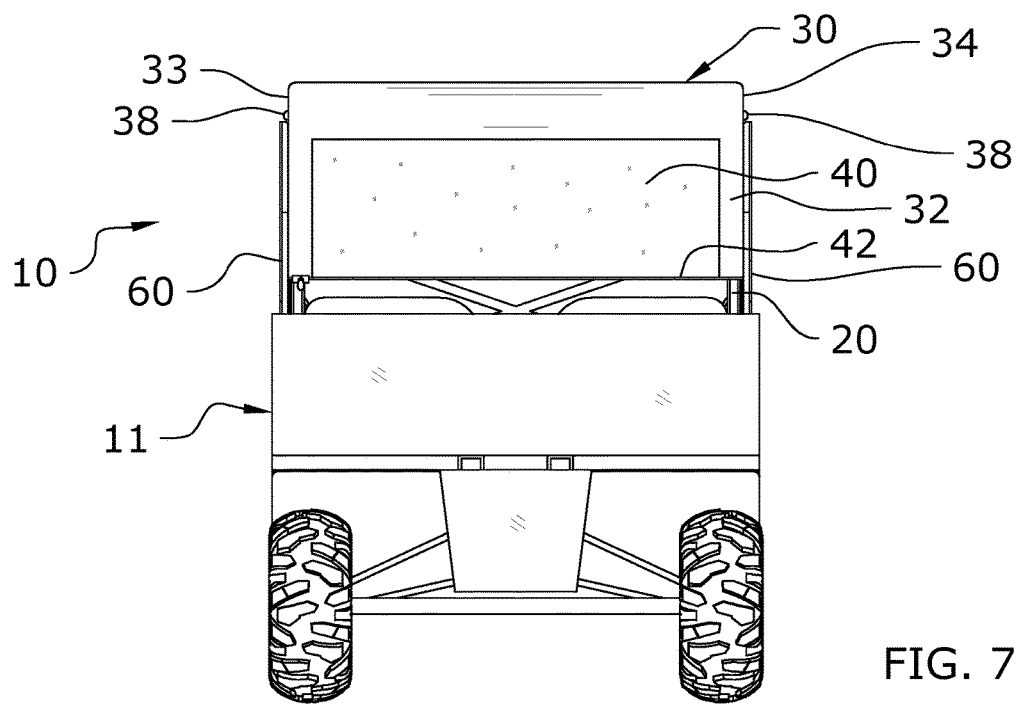
FIG. 7 is a rear view of a removable panel system with the rear window panel removed in accordance with an example embodiment.

The front end 21 of the frame 20 is adapted to removably receive and retain a windshield panel 70 such as shown in FIGS. 1-2. The rear end 22 of the frame 20 is adapted to removably receive and retain a rear window extension 40 which extends from the roof panel 30 as well as an optional rear window panel 44 that is removably connected to the rear window extension 40 such as shown in FIGS. 3-4.

Figure 8:
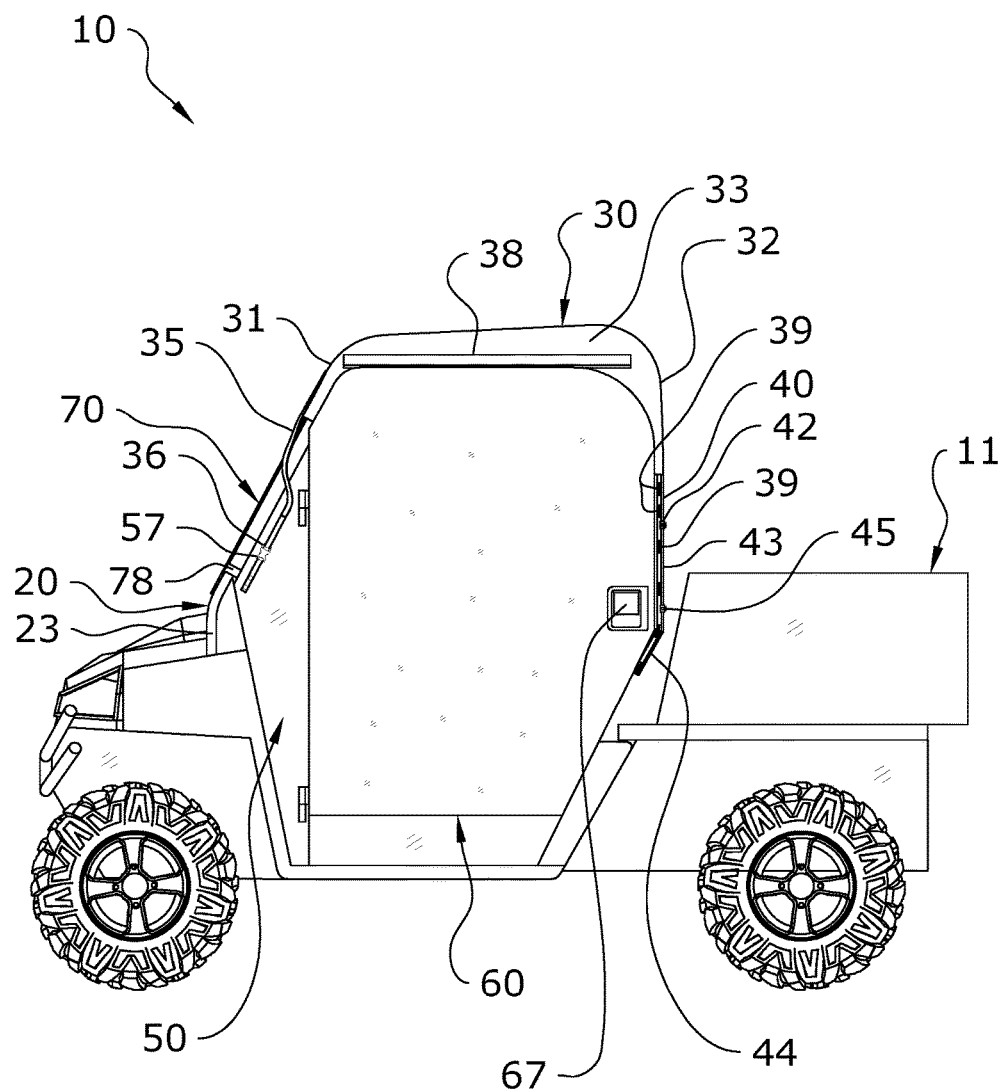
FIG. 8 is a first side view of a removable panel system in accordance with an example embodiment.
Figure 9:
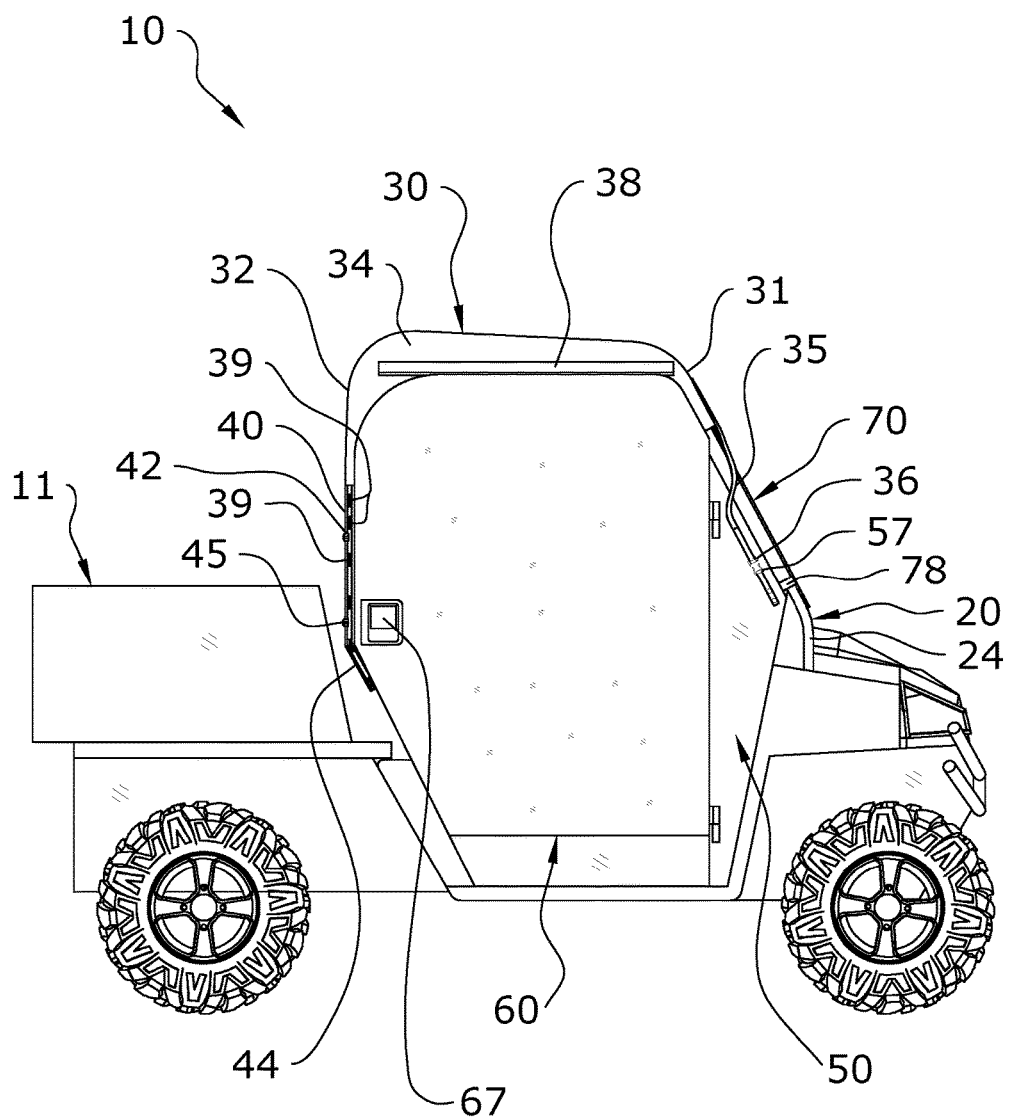
FIG. 9 is a second side view of a removable panel system in accordance with an example embodiment.
Figure 12:
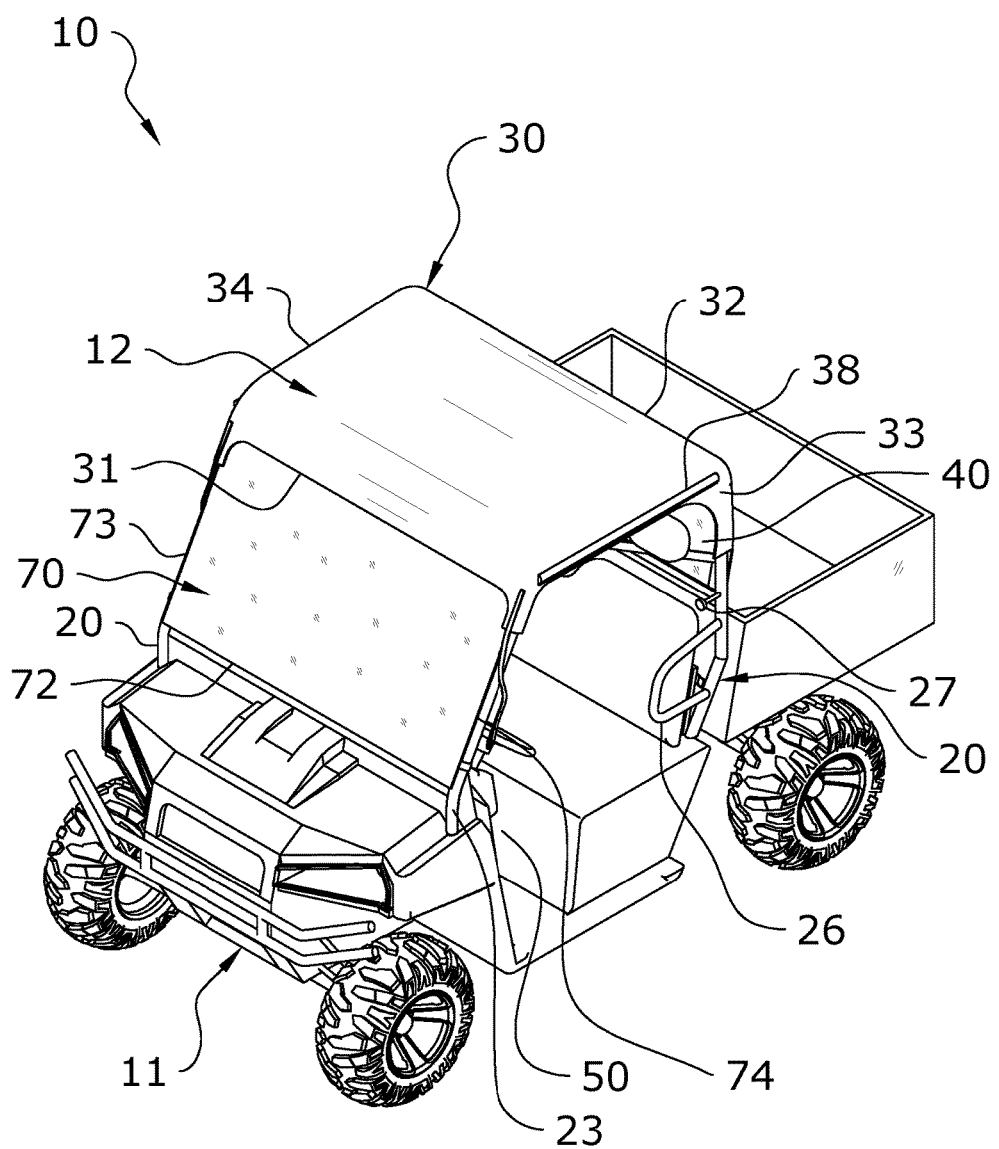
FIG. 12 is a perspective view of a removable panel system in accordance with an example embodiment having a windshield panel and roof panel installed.

The first side 23 of the frame 20 is adapted to removably receive and retain a door receiver panel 50 and/or door panel 60 such as shown in FIG. 8. The second side 24 of the frame 20 is similarly adapted to removably receive and retain its own door receiver panel 50 and/or door panel 60 such as shown in FIG. 9. As shown in FIG. 12, the upper end 25 of the frame 20 is adapted to removably receive and retain a roof panel 30.

The frame 20 may include arm rests 26 as best shown in FIG. 10. The embodiment shown in the figures includes arm rests 26 on the first side 23 and second side 24 of the frame 20. The frame 20 may also include door latch connectors 27 which removably engage with corresponding latches 66 on the door panels 60. In the embodiment shown in the figures, the frame 20 includes door latch connectors 27 positioned at its first side 23 and its second side 24 to accommodate a pair of door panels 60. In some embodiments, more or less door panels 60 may be provided. The door latch connectors 27 are illustrated as comprising bolts merely for exemplary purposes, as any type of door latch connector 27 known in the art may be utilized to releasably close the door panels 60.

Figure 11:
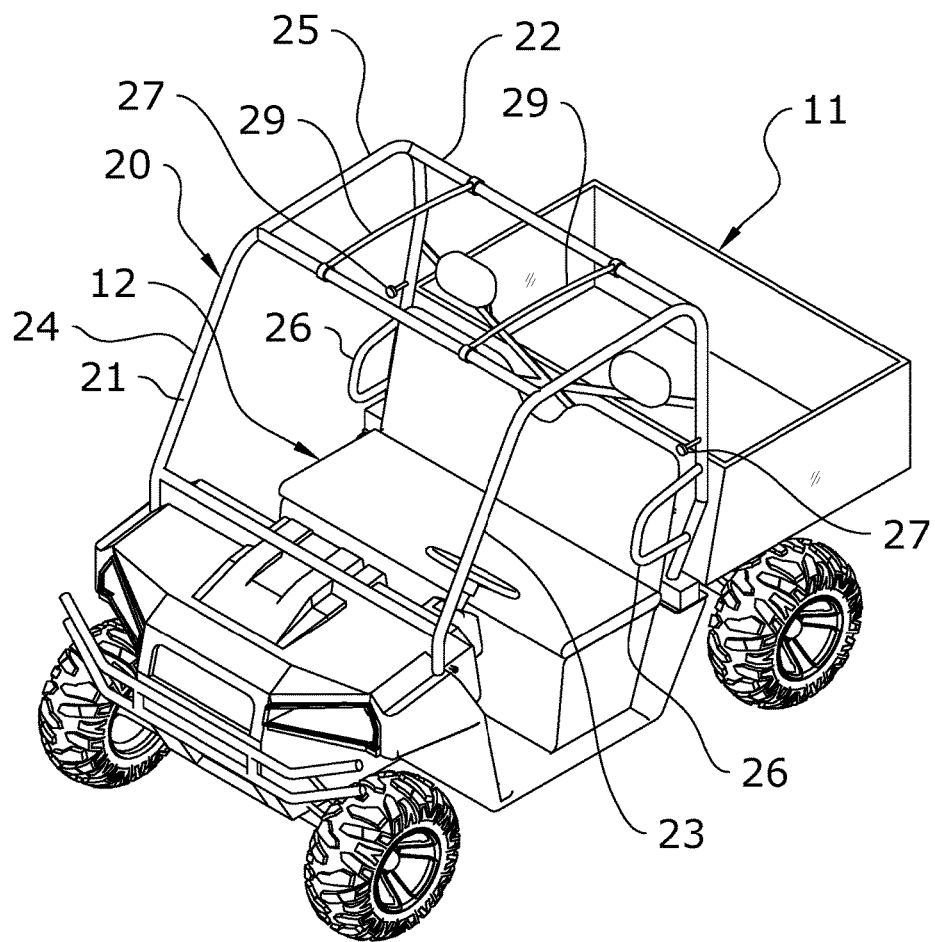
FIG. 11 is a perspective view of a removable panel system in accordance with an example embodiment having no panels installed.

As shown in FIG. 11, a pair of arch supports 29 may extend across the upper end 25 of the frame 20 for additional support. These arch supports 29 may comprise elongated members that may be bowed outwardly as shown in the figures. The arch supports 29 may be integral with the frame 20 or may be removably connected. More or less arch supports 29 may be included in different embodiments depending on the structural needs of the frame 20.

C. Roof Panel.

Figure 13:
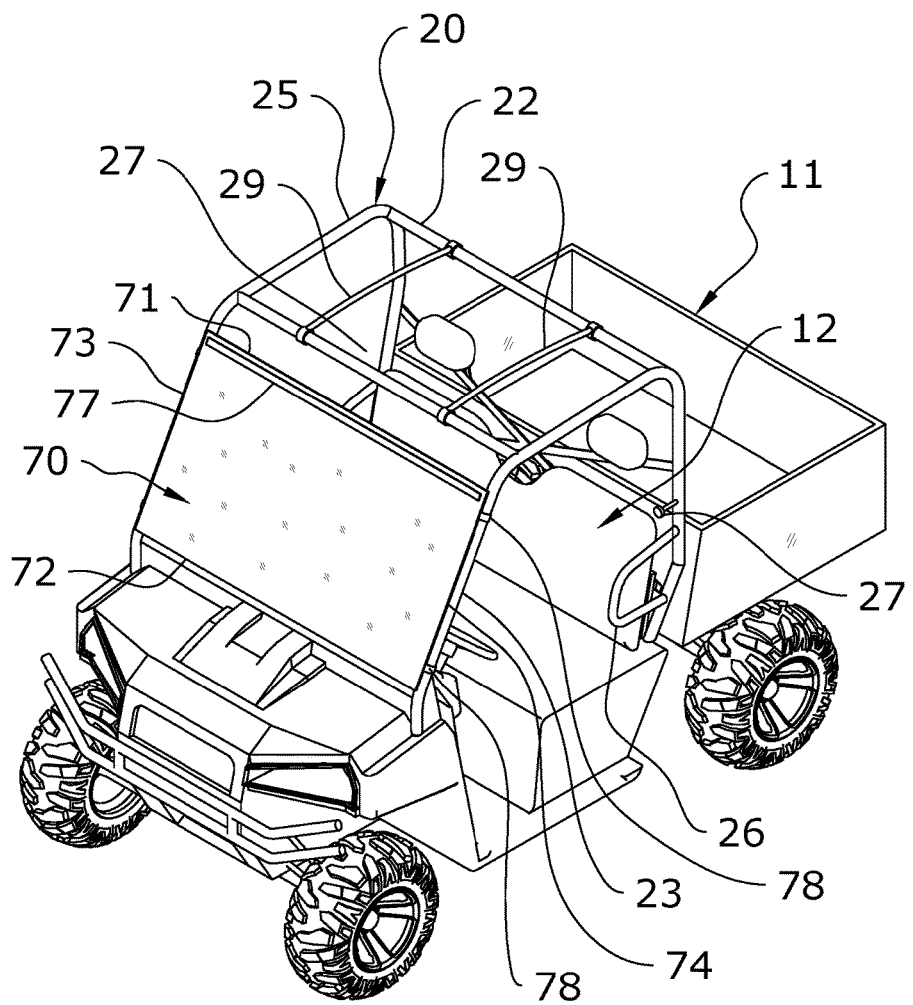
FIG. 13 is a perspective view of a removable panel system in accordance with an example embodiment having only a windshield panel installed.

As shown in FIGS. 10 and 13, a roof panel 30 may be removably connected to the frame 20. The roof panel 30 may be removably connected to the frame 20 either by itself, or in combination with one or more additional panels 44, 50, 60, 70. The shape, size, orientation, and configuration of the roof panel 30 may vary in different embodiments to suit different types of vehicles 11 or cabs 12.

As best shown in FIGS. 24-29, the roof panel 30 comprises a front end 31, a rear end 32, a first side 33, and a second side 34. The front end 31 of the roof panel 30 is removably connected to the front end 21 of the frame 20. The rear end 32 of the roof panel 30 is removably connected to the rear end 22 of the frame 20. Similarly, the first and second sides 33, 34 of the roof panel 30 are removably connected to the respective first and second sides 23, 24 of the frame 20.

Figure 28:
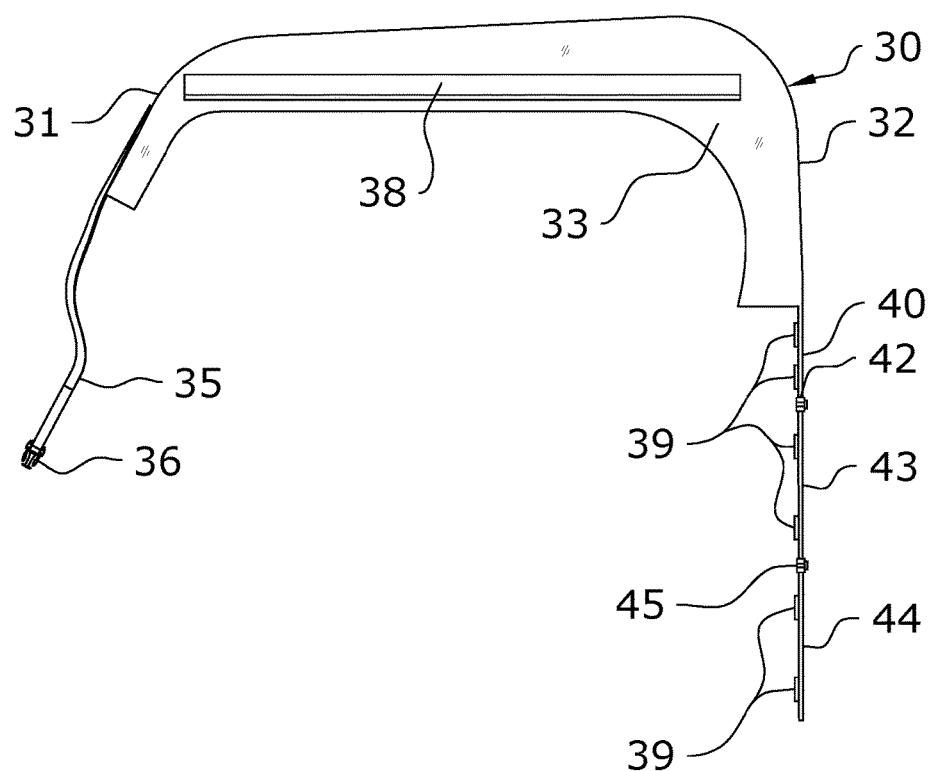
FIG. 28 is a first side view of a roof panel of a removable panel system in accordance with an example embodiment.
Figure 29:
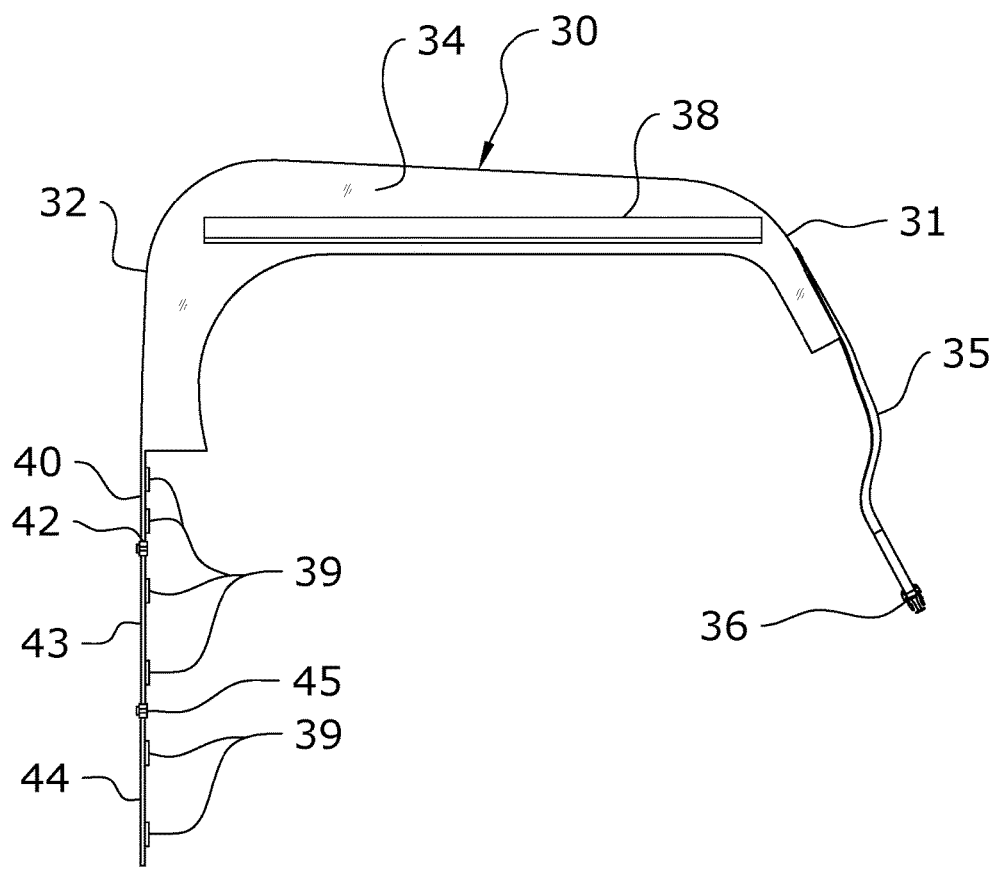
FIG. 29 is a second side view of a roof panel of a removable panel system in accordance with an example embodiment.
Figure 30:
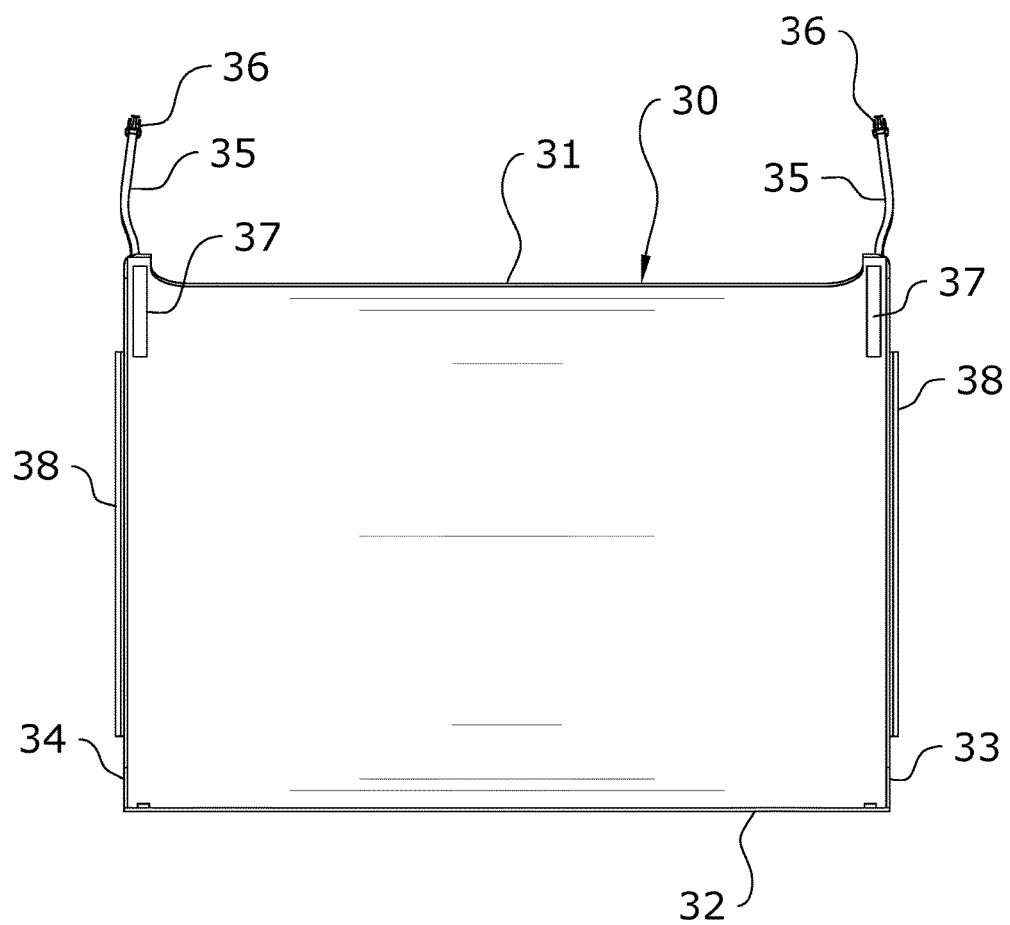
FIG. 30 is a top view of a roof panel of a removable panel system in accordance with an example embodiment.

The roof panel 30 may be removably connected to the upper end 25 of the frame 20 by various methods or devices. In the exemplary figures, a pair of connection straps 35 extends from the front end 21 of the frame 20. Each of the connection straps 35 includes a connection buckle 36 at its distal end such as shown in FIGS. 28 and 29. The connection buckles 36 are adapted to removably engage with corresponding buckle receivers 57 on the door receiver panels 50.

The roof panel 30 may also include a roof fastener 37 which provides additional stability to the interconnection between the roof panel 30 and the frame 20. In the exemplary figures, the roof fastener 37 is shown as comprising an adhesive strip (such as a hook-and-loop fastener) which extends along the underside of the front end 31 of the roof panel 30. It should be appreciated that the roof fastener 37 may be positioned at various other locations on the roof panel 30 to engage with corresponding fasteners 77 either on the frame 20 or on other panels 50, 60, 70.

Similar to the roof fasteners 37, the roof panel 30 may also include button connectors 39 which engage with corresponding button receivers (not shown) which may be positioned along the frame 20 or other panels 50, 60, 70. The button connectors 39 provide additional connection points between the roof panel 30 and the frame 20 or other panels 50, 60, 70.

As shown in FIGS. 1-4, the roof panel 30 may also include one or more drip pans 38 which prevent water from the roof panel 30 from running into the cab 12. In the exemplary figures, the drip pans 38 are positioned on the first side 33 and second side 34 of the roof panel 30. The shape, structure, size, orientation, and positioning of the drip pans 38 may vary in different embodiments. In the exemplary embodiment of the figures, the drip pans 38 comprise elongated pans which extend along the sides 33, 34 of the roof panels 30. Water from the roof panel 30 will be drawn away from the cab 12 by the drip caps 38.

Referring to FIGS. 24-29, the roof panel 30 may include a rear window extension 40 which extends downwardly from the rear end 32 of the roof panel 30. The rear window extension 40 functions as a rear window which extends down from the roof panel 30 to at least partially cover the rear end 22 of the frame 20.

Figure 24:
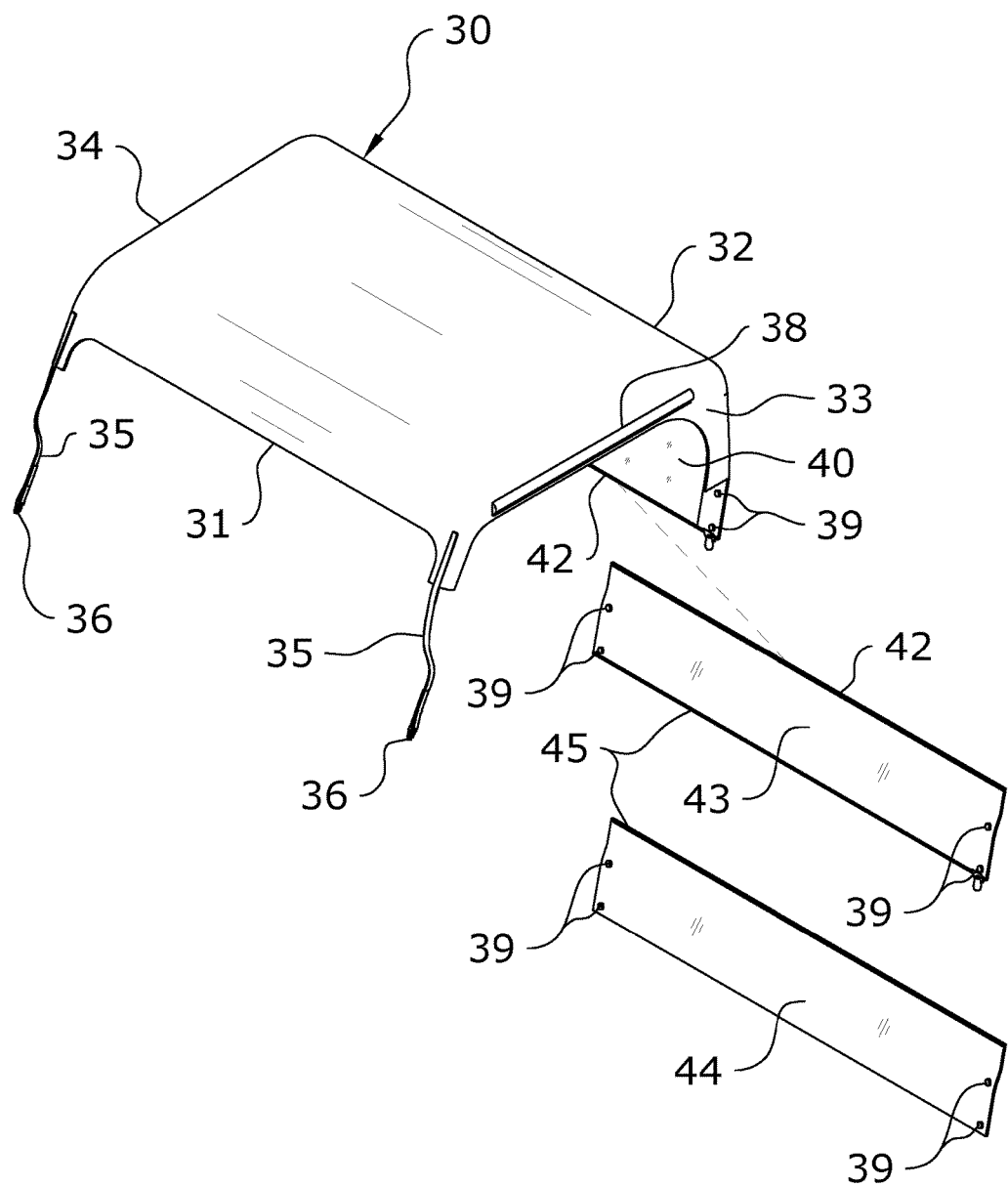
FIG. 24 is a frontal perspective view of a roof panel of a removable panel system in accordance with an example embodiment in which the rear window panel is removed.
Figure 25:
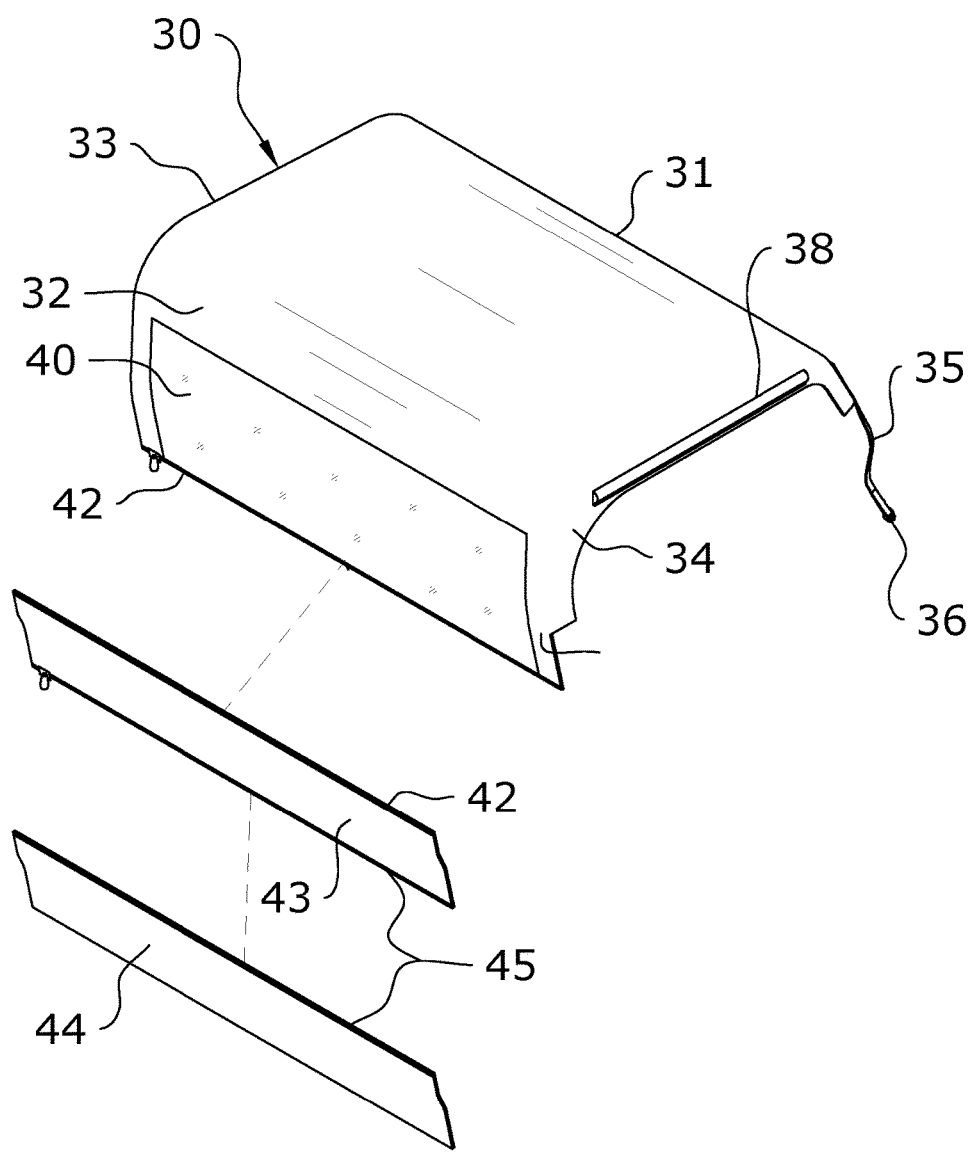
FIG. 25 is a rear perspective view of a roof panel of a removable panel system in accordance with an example embodiment in which the rear window panel is removed.
Figure 26:
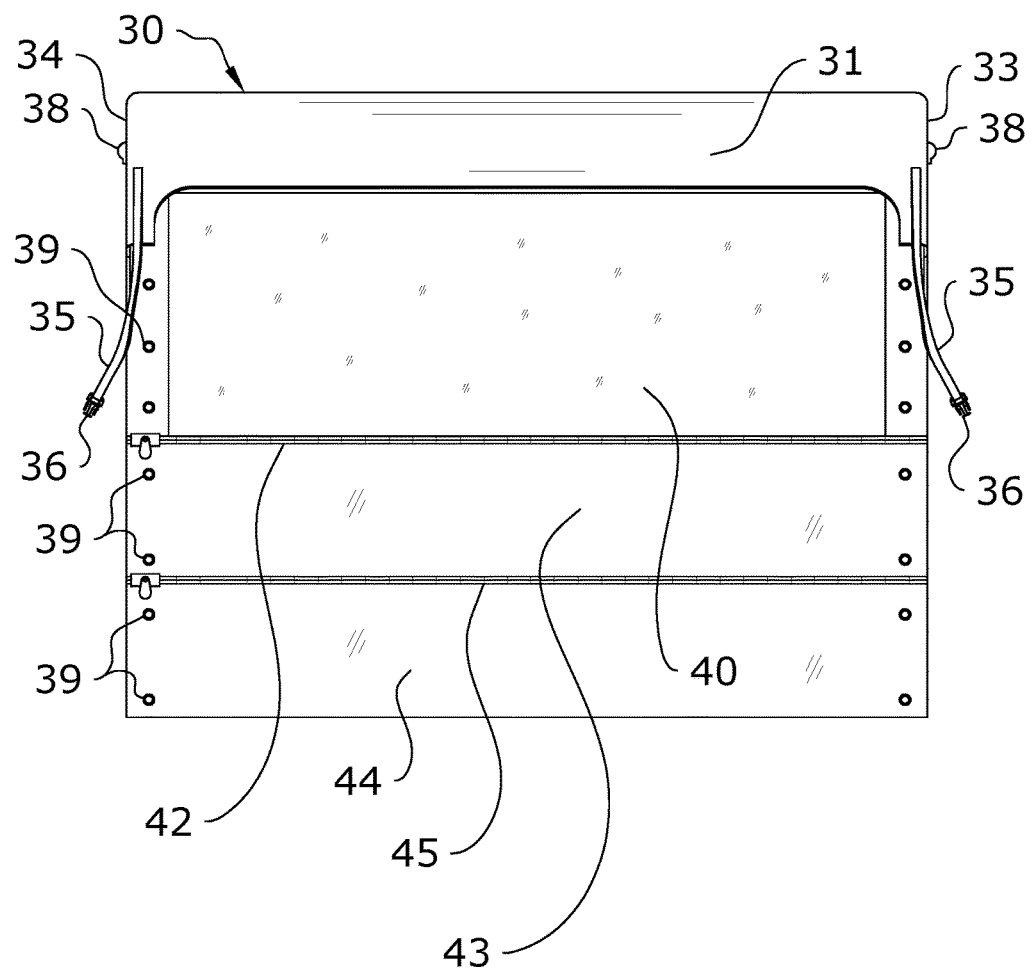
FIG. 26 is a frontal view of a roof panel of a removable panel system in accordance with an example embodiment.
Figure 27:
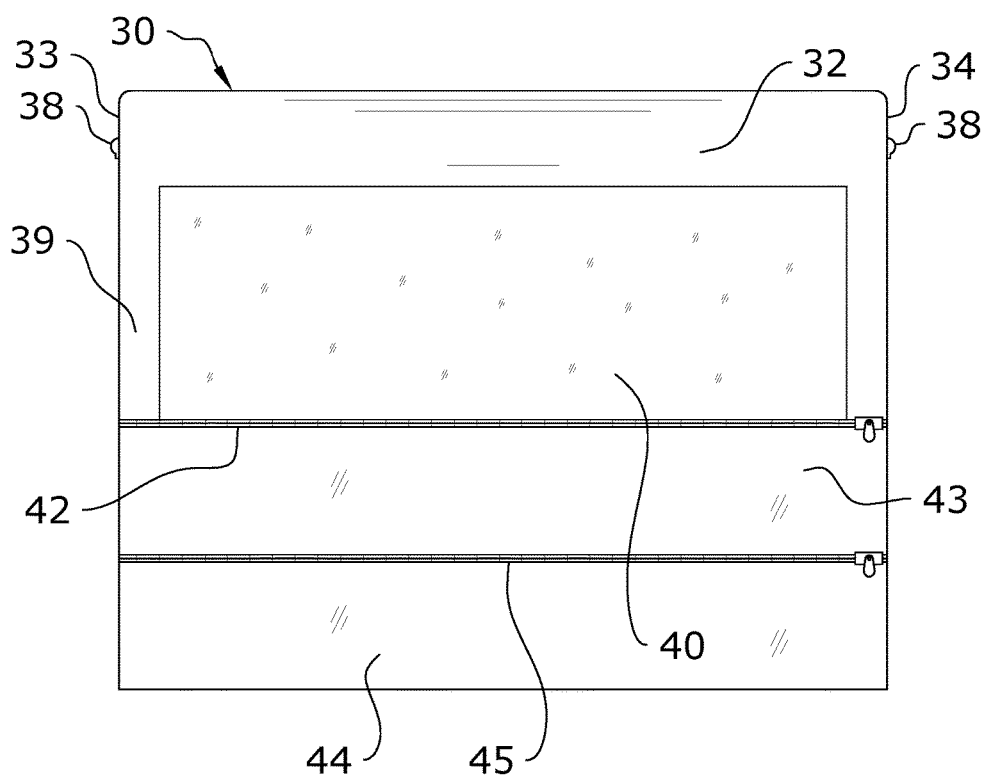
FIG. 27 is a rear view of a roof panel of a removable panel system in accordance with an example embodiment.

In some embodiments such as shown in FIG. 24, one or more rear window panels 43, 44 may be removably connected to the lower end of the rear window extension 40. The rear window panels 43, 44 may be included so that a portion of the rear window of the cab 12 may be easily removed to allow airflow. Although the figures illustrate a first rear window panel 43 and a second rear window panel 44, it should be appreciated that more or less rear window panels 43, 44 may be utilized in different embodiments.

Each of the rear window panels 43, 44 45 will generally comprise a rectangular-shaped, transparent or semi-transparent panel which is removably connected to the rear window extension 40. In the exemplary embodiment, a zipper configuration is shown wherein the rear window extension 40 has a first zipper 42 at its lower end to removably connect the first rear window panel 43. The first rear window panel 43 includes a second zipper 45 at its lower end to removably connect the second rear window panel 44. Additional zippers 42, 45 may be included to accommodate additional rear window panels 43, 44 in some embodiments.

D. Door Receiver Panels.

As best shown in FIGS. 20-23, door receiver panels 50 may be removably connected to the frame 20. The door receiver panels 50 provide a hinged connection for the removable door panels 60. The door receiver panels 50 may also act as a point to which the connection straps 35 of the roof panel 30 is connected.

Figure 20:
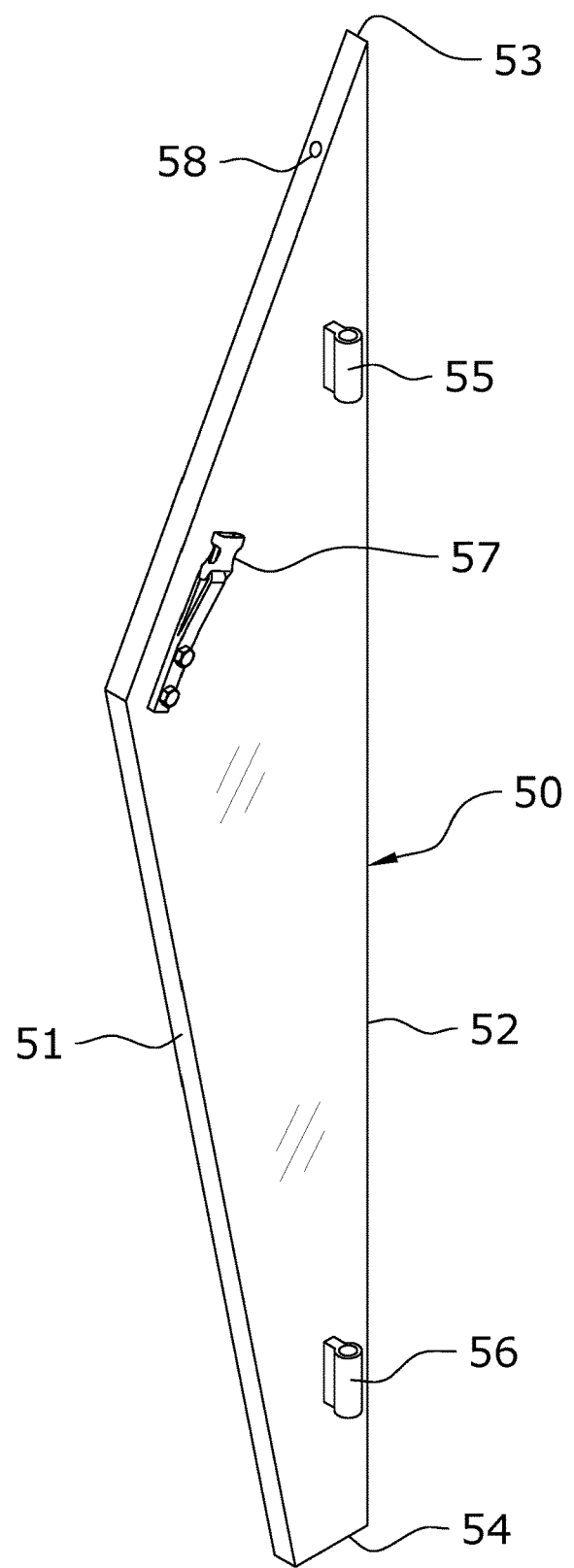
FIG. 20 is a frontal perspective view of a door receiver panel of a removable panel system in accordance with an example embodiment.
Figure 21:
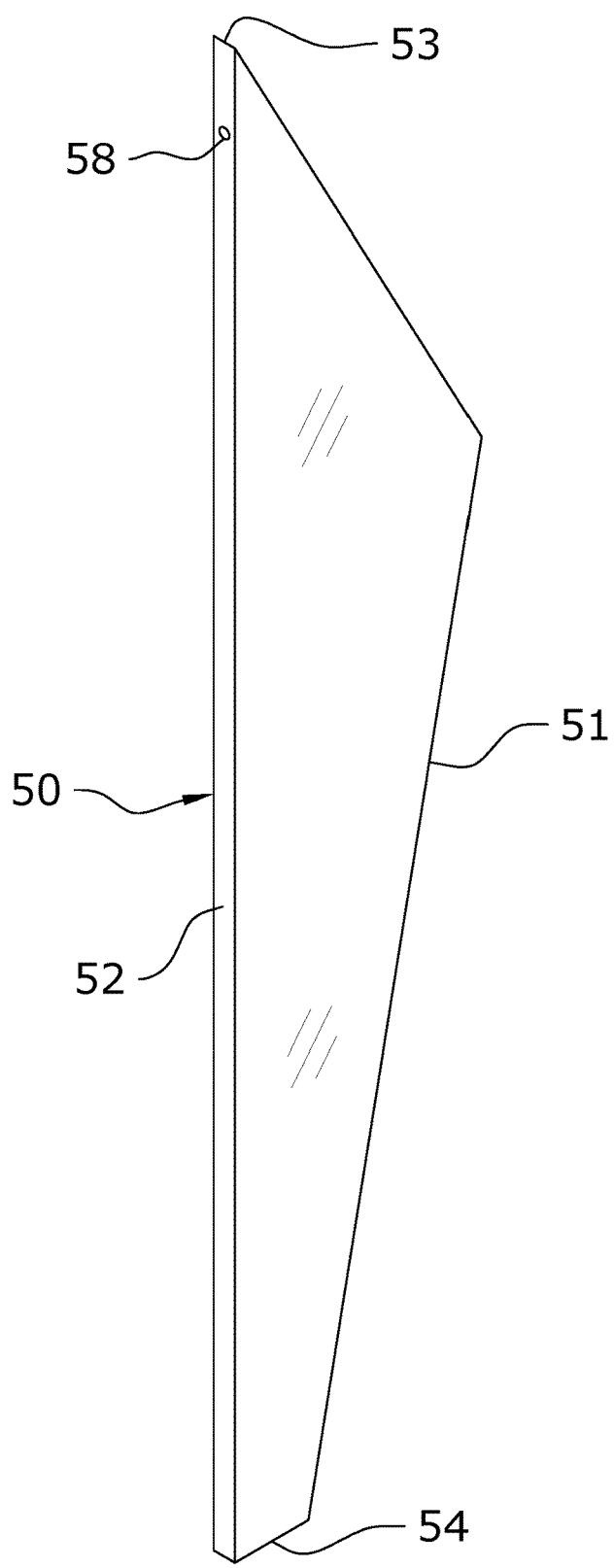
FIG. 21 is a rear perspective view of a door receiver panel of a removable panel system in accordance with an example embodiment.
Figure 22:
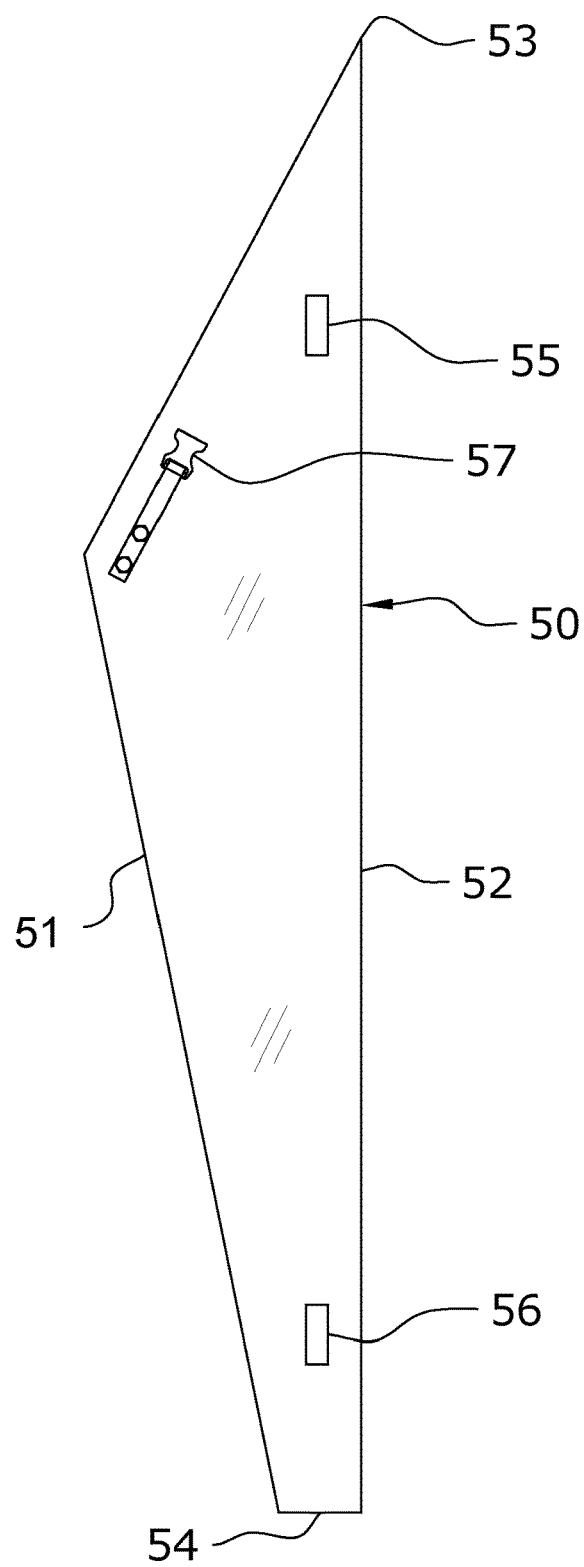
FIG. 22 is a front view of a door receiver panel of a removable panel system in accordance with an example embodiment.
Figure 23:
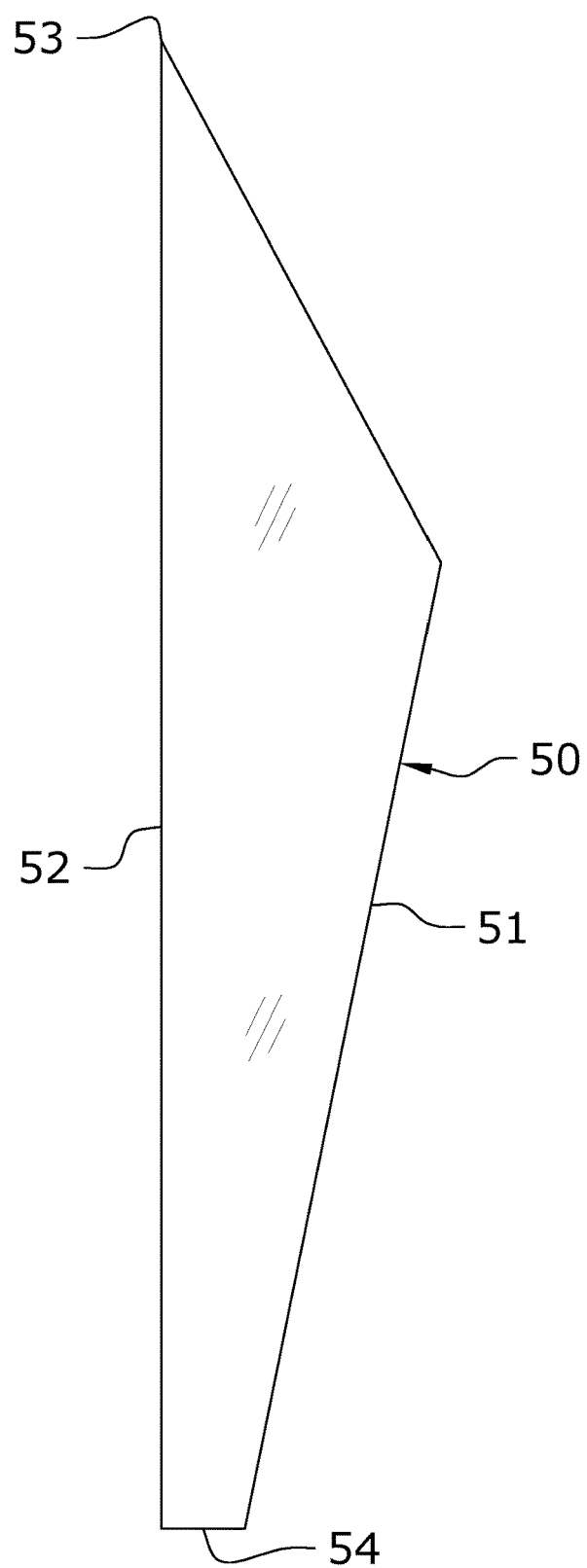
FIG. 23 is a rear view of a door receiver panel of a removable panel system in accordance with an example embodiment.

As shown in FIGS. 20 and 21, the door receiver panels 50 comprise elongated panels which are removably connected to the sides 23, 24 of the frame 20. Generally, a first door receiver panel 50 is removably connected to the first side 23 of the frame 20 to accommodate a first door panel 60 and a second door receiver panel 50 is removably connected to the second side 24 of the frame 20 to accommodate a second door panel 60.

The door receiver panels 50 generally comprise a front end 21, a rear end 52, an upper end 53, and a lower end 54. The front end 21 of the door receiver panels 50 may converge at a point to form a generally triangular configuration as shown in the figures.

A first hinge receiver 55 is positioned near the upper end 53 of the door receiver panel 50 and a second hinge receiver 56 is positioned near the lower end 54 of the door receiver panel 50. The hinge receivers 55, 56 are adapted to removably engage with corresponding hinge pins 62, 64 on the door panels 60 to effectuate a hinged connection between the door panel 60 and the door receiver panel 50, which is connected to the frame 20.

The door receiver panels 50 may also include buckle receivers 57 which are adapted to removably engage with the connection buckles 36 on the connection straps 35 which extend from the roof panel 30. The interconnection between the connection buckles 36 and the buckle receivers 57 functions to provide an additional connection between the roof panel 30 and the frame 20 to which the door receiver panels 50 are connected.

The door receiver panels 50 may be integral with the frame 20 or may be removably connected as shown in the figures. In the exemplary figures, each door receiver panel 50 includes a bolt receiver 58 extending therethrough, such as from the front end 51 to the rear end 52 of the door receiver panel 50. A bolt 59 may be extended through this bolt receiver 58 to engage with the frame 20 so that the door receiver panel 50 may be directly connected to the frame 20.

E. Door Panels.

As best shown in FIGS. 16-19, door panels 60 may be removably connected to the frame 20. Although the figures illustrate a vehicle 11 and cab 12 which only accommodate two door panels 60, it should be appreciated that more or less door panels 60 may be used for different embodiments. Each door panel 60, when connected to the frame 20, serves as a hinged door to provide access to the cab 12. The door panels 60 may be freely connected or disconnected to accommodate different configurations desirable by the operator.

Figure 16:
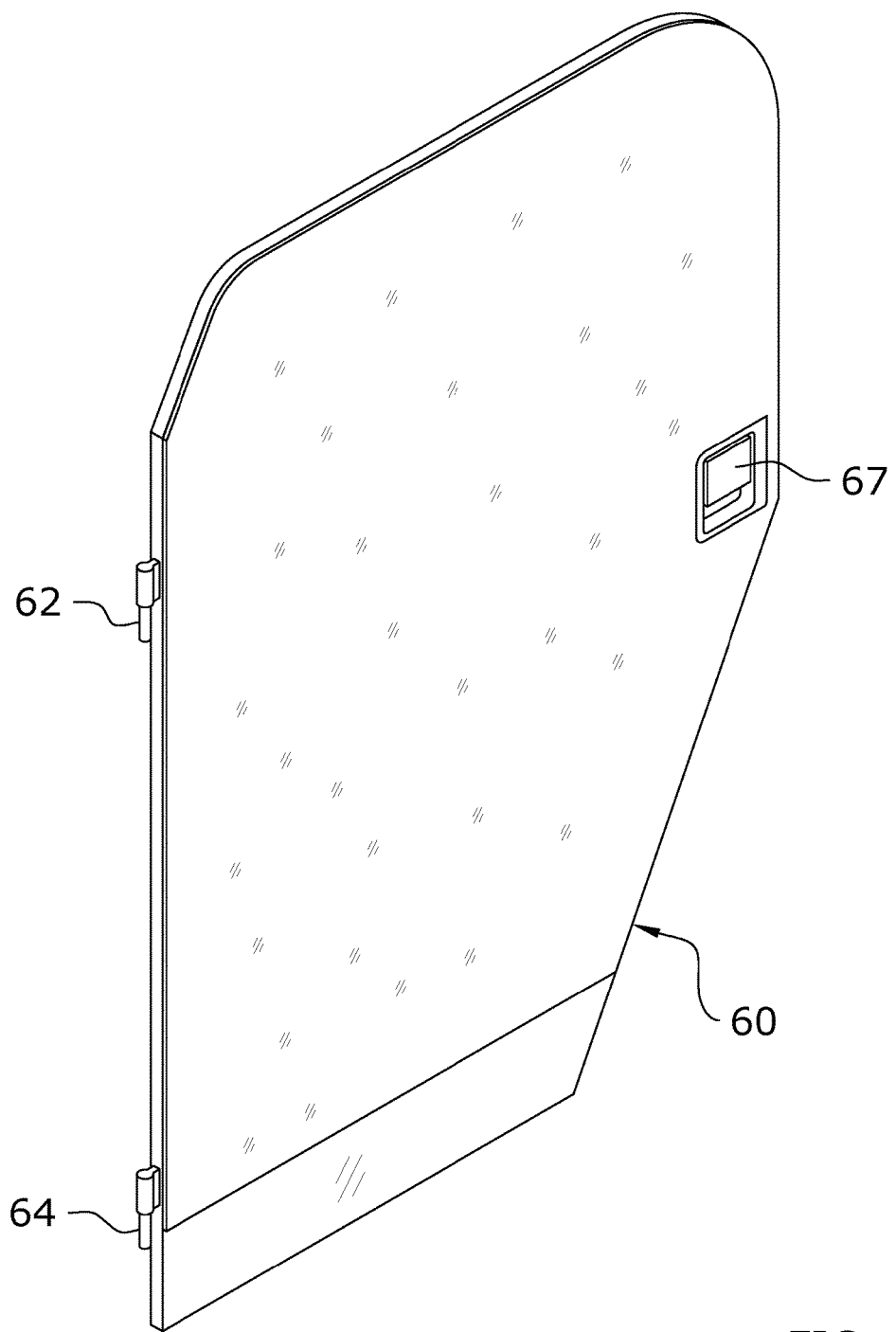
FIG. 16 is a frontal perspective view of a door panel of a removable panel system in accordance with an example embodiment.

As best shown in FIG. 16, the door panels 60 each include a first hinge pin 62 and a second hinge pin 64 which are adapted to engage with corresponding hinge receivers 55, 56 on the frame 20 or the door receiver panels 50. It should be appreciated that more or less hinge pins 62, 64 and hinge receivers 55, 56 may be utilized in different embodiments. The positioning of the hinge pins 62, 64 and hinge receivers 55, 56 may also vary across different embodiments.

The door panels 60 may also include a latch 66 which selectively engages with a corresponding door latch connector 27 on the frame 20. The latch 66 and door latch connectors 27 are utilized to lockably and removably engage together to keep the door panel 60 closed when needed. A handle 67 is provided which may be pulled out to disengage the latch 66 and door latch connector 27 and allow the door panel 60 to be opened. The door panel 60 may also include a cross bar 68 such as shown in FIG. 17 which both provides structural integrity for the door panel 60 as well as a point where an operator may grasp the door panel 60 to open or close it.

Figure 17:
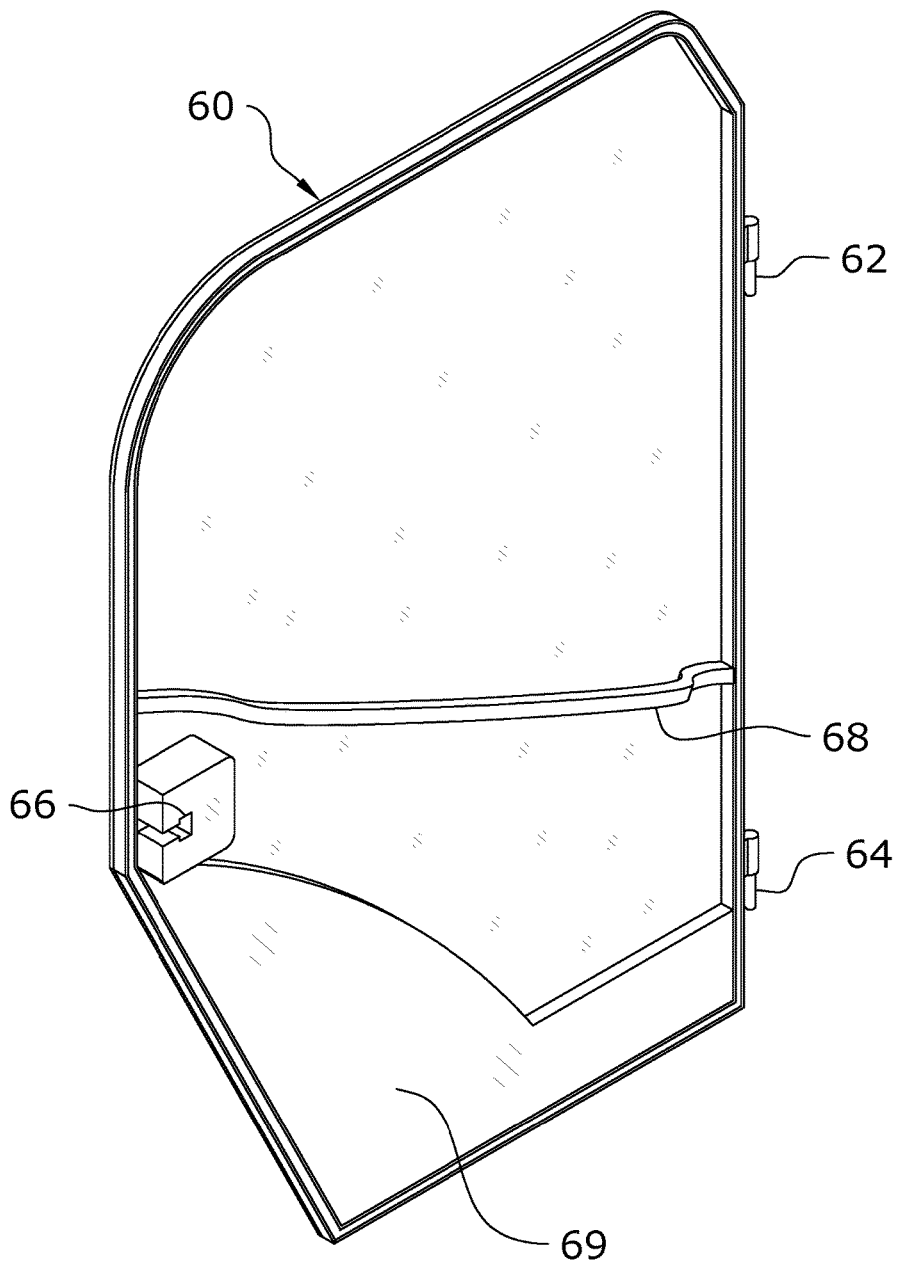
FIG. 17 is a rear perspective view of a door panel of a removable panel system in accordance with an example embodiment.
Figure 18:
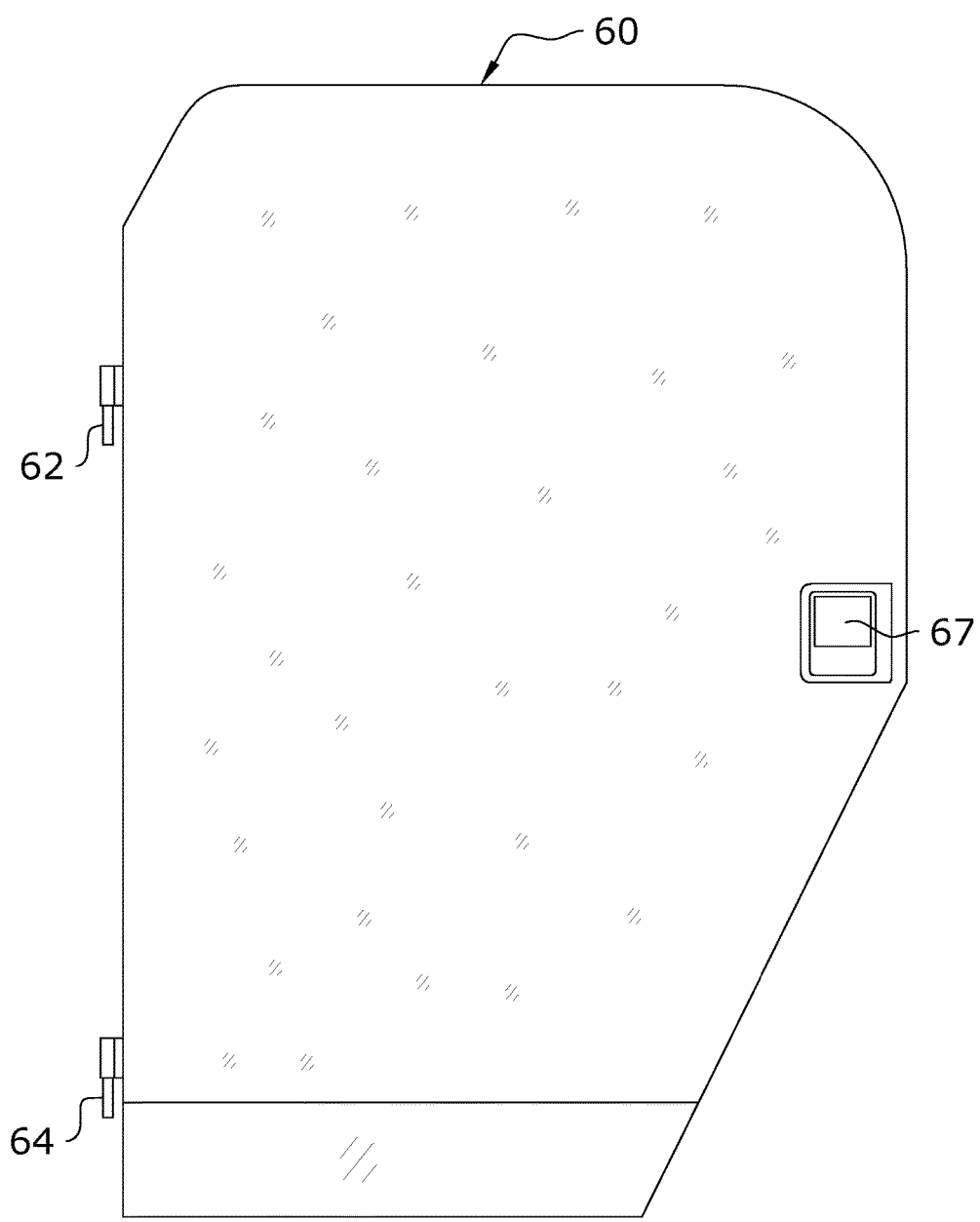
FIG. 18 is a frontal view of a door panel of a removable panel system in accordance with an example embodiment.
Figure 19:
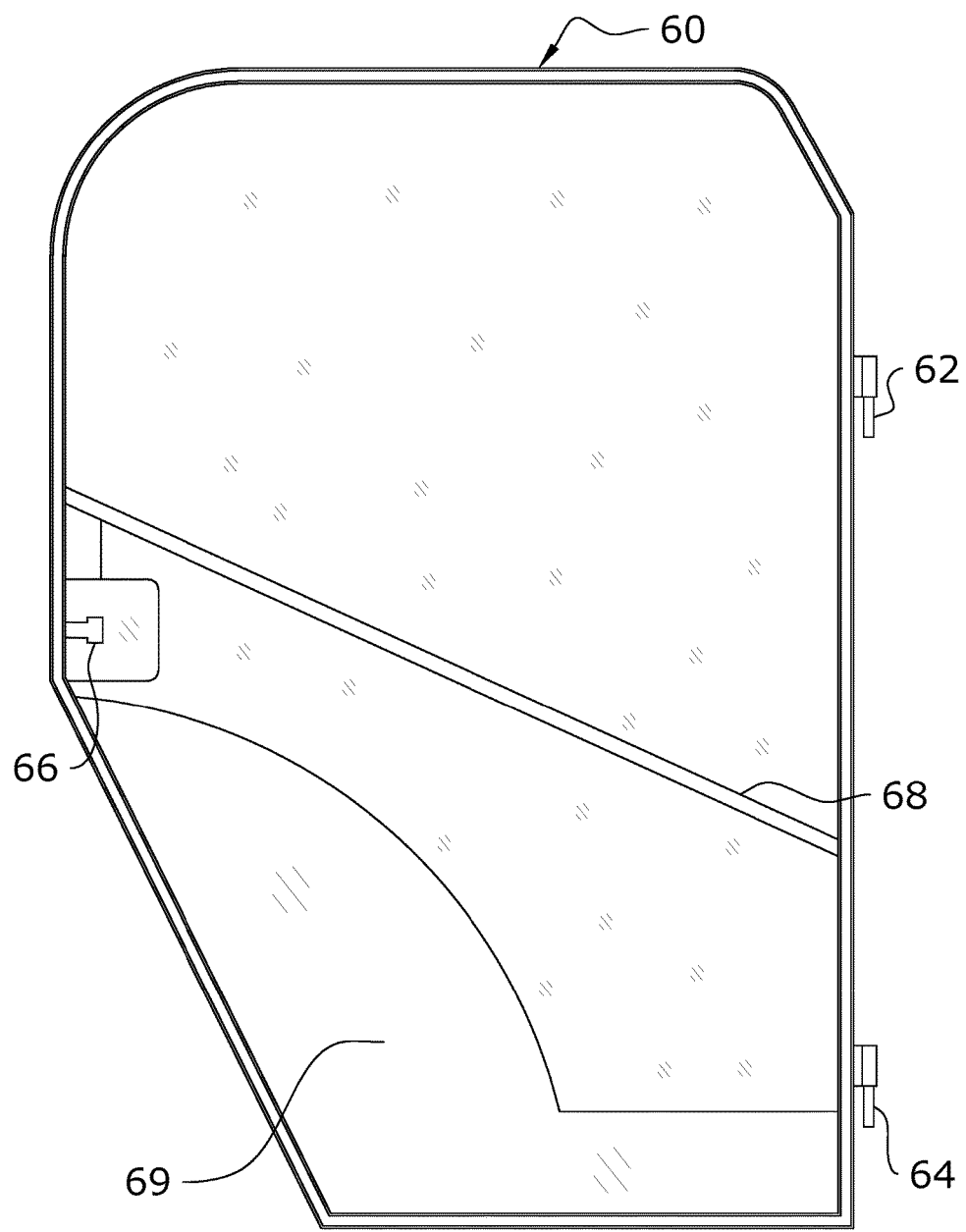
FIG. 19 is a rear view of a door panel of a removable panel system in accordance with an example embodiment.

As best shown in FIGS. 17 and 19, each door panel 60 may include sound dampening material 69 which provides both thermal insulation and sound reduction for the cab 12. The sound dampening material 69 is illustrated as being positioned along the bottom of the door panels 60 and near the frontal portion of the door panels 60 which faces the engine compartment. Positioning of the sound dampening material 69 at this position will aid in reducing engine sound in the cab 12.

It should be appreciated that various types of sound dampening materials 69 known in the art may be utilized. Additionally, the size, positioning, orientation, and configuration of the sound dampening material 69 may vary in different embodiments and should not be construed as limited by the exemplary figures.

F. Windshield Panel.

As best shown in FIG. 10, a windshield panel 70 may be provided to removably connect to the front end 21 of the frame 20 to provide an optional windshield for the cab 12. The windshield panel 70 generally comprises a substantially rectangular shape with an upper end 71, a lower end 72, a first side 73, and a second side 74.

The windshield panel 70 may be removably connected to the frame 20 in a number of manners. In the exemplary figures, which should not be construed as limiting with respect to the connection of the windshield panel 70 to the frame 20, connector straps 78 are provided which extend from the windshield panel 70 to wrap around portions of the frame 20 before connecting back to themselves or the windshield panel 70. This is merely an exemplary configuration as numerous other methods or devices may be utilized to removably connect the windshield panel 70 to the frame 20. In some embodiments, the windshield panel 70 may be integral with the frame 20 and thus not removable from the cab 12.

Fasteners 77 may also be provided near the upper end 71 of the windshield panel 70 to which the corresponding roof fastener 37 may removably engage. In the exemplary figures, fasteners 77 comprised of an adhesive strip extend along the upper end 71 of the windshield panel 70 to which the corresponding roof fastener 37 may removably engage.

G. Operation of Preferred Embodiment.

The exemplary figures depict various configurations of the frame 20 with different panels 30, 44, 50, 60, 70 being selectively and removably connected to the frame 20. It should be appreciated that any combination of panels 30, 44, 50, 60, 70 may be connection to or disconnected from the frame 20 to accomplish different configurations for the cab 12. Thus, the exemplary figures and descriptions herein should not be construed as limiting the present invention to any particular configuration of connected panels 30, 44, 50, 60, 70 on the frame 20.

FIG. 11 illustrates a vehicle 11 including a frame 20 which defines the cab 12. Various panels 30, 44, 50, 60, 70 may be selectively and removably connected to the frame 20 to modify the cab 12. FIG. 12 illustrates a configuration in which the roof panel 30 and windshield panel 70 are connected to the frame 20 to form a cab 12 which allows easy entrance and exit by omitting the door panels 60.

To install the roof panel 30 on the framed 20, the roof panel 30 is first positioned on the upper end 25 of the frame 20 such that the connection straps 35 hang downwardly. The connection straps 35 may then be connected to either the frame 20 or the door receiver panels 50 if they are present. The connection straps 35 anchor the roof panel 30 on the upper end 25 of the frame 20.

The roof fasteners 37, generally comprised of a strip of hook-and-loop fastener material, may engage with corresponding fasteners 77 on either the frame 20 or on the windshield panel 70 if the windshield panel 70 is installed. FIG. 12 illustrates an embodiment in which both the windshield panel 70 and roof panel 30 are installed, but it should be appreciated that the windshield panel 70 may be omitted in some configurations.

FIG. 13 illustrates a configuration in which only a windshield panel 70 is connected to the frame 20. To connect the windshield panel 70 to the frame 20, one need only wrap the connector straps 78 of the windshield panel 70 around the frame 20 and secure the connector straps 78 either to themselves or to the windshield panel 70 such that they loop around the frame 20 to connect the windshield panel 70. The windshield panel 70 may similarly be disconnected from the frame 20 by disconnecting the connector straps 78.

Figure 14:
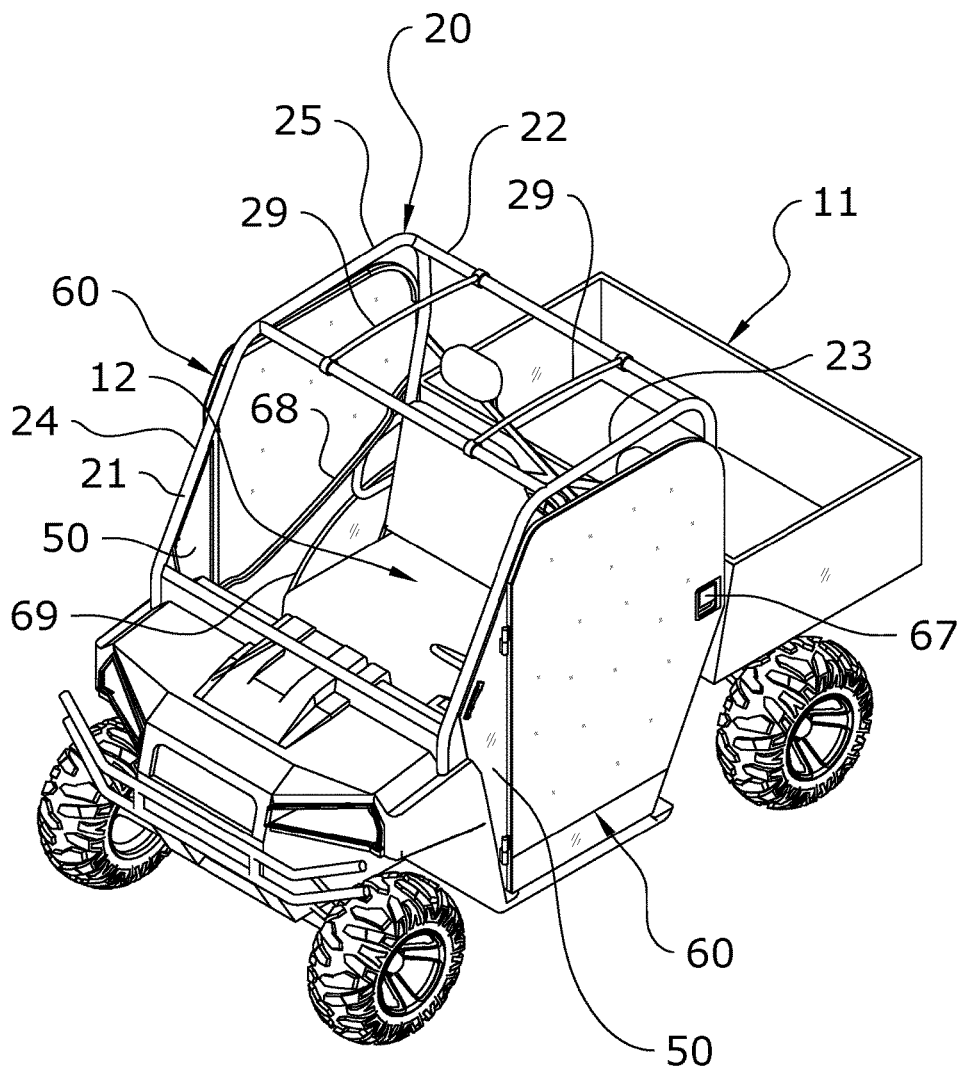
FIG. 14 is a perspective view of a removable panel system in accordance with an example embodiment having only door panels installed.
Figure 15:
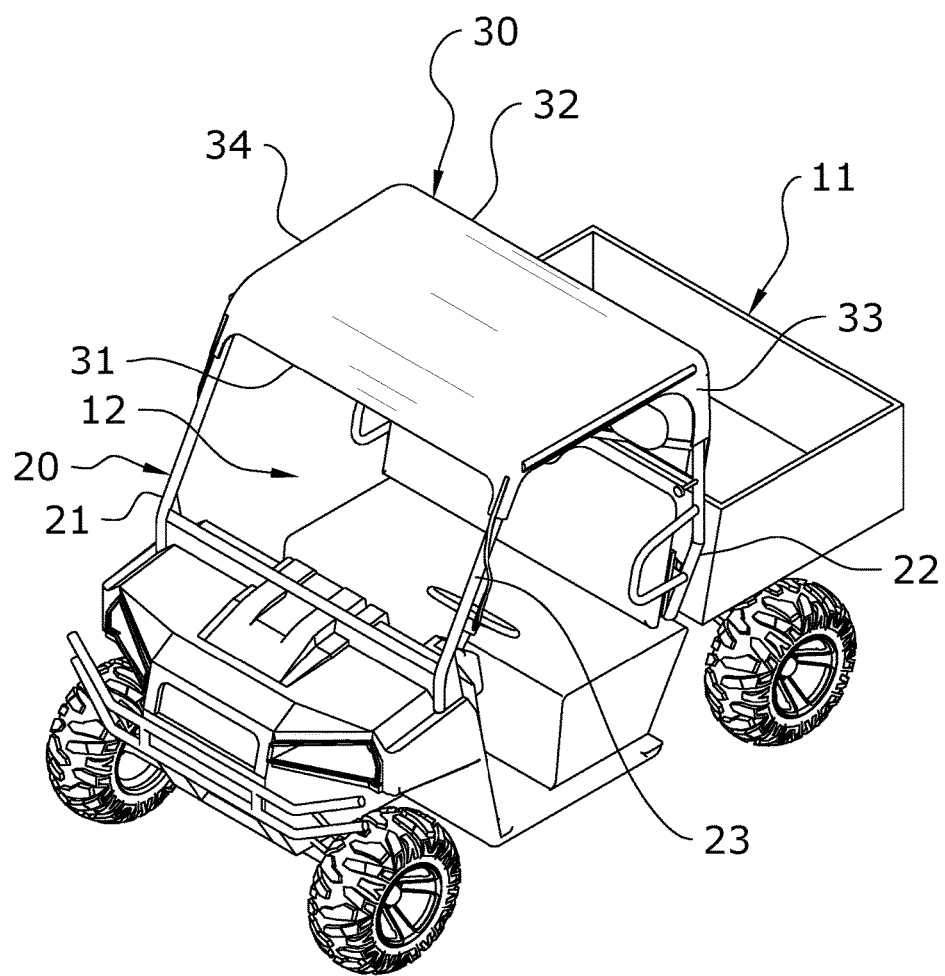
FIG. 15 is a perspective view of a removable panel system in accordance with an example embodiment having only a roof panel installed.

FIG. 14 illustrates a configuration in which only door receiver panels 50 and door panels 60 are connected to the frame 20. The door receiver panels 50 are first connected to the frame 20, such as by the use of bolt receivers 58 and bolts 59 which extend through the bolt receivers 58 of the door receiver panels 50 and connect directly to the frame 20.

With the door receiver panels 50 connected to the frame 20, the door panels 60 may be installed. The door panels 60 are installed by lowering the door panel 60 such that the hinge pins 62, 64 of the door panel 60 are inserted within the corresponding hinge receivers 55, 56 on the door receiver panel 50. It should be appreciated that in some embodiments the door receiver panels 50 may be omitted. In such an embodiment, the hinge receivers 55, 56 may be on the frame 20 itself.

In either case, once the hinge pins 62, 64 are engaged within the hinge receivers 55, 56, the door panels 60 may freely open or close. The latch 66 on the door panels 60 engages with the corresponding door latch connectors 27 on the frame 20 to selectively close the door panel 60 against the frame 20. A handle 67 may be pulled to disengage the door latch connectors 27 and latch 66 to allow the door panels 60 to swing open about their hinged connections with the frame 20 or door receiver panel 50.

FIGS. 24-27 illustrate modification of the rear window extension 40 of the roof panel 30. As shown, the rear window extension 40 may include a rear window panel 44 that may be connected to or disconnected from the rear window extension 40 of the roof panel 30. The exemplary embodiment shown in the figures illustrates a zipper configuration using a first zipper 42 on the rear window extension 40 and a second zipper 45 on the rear window panel 44 which allows the rear window panel 44 to be removably connected to the rear window extension 40.

Unless otherwise defined, all technical and scientific terms used herein have the same meaning as commonly understood by one of ordinary skill in the art to which this invention belongs. Although methods and materials similar to or equivalent to those described herein can be used in the practice or testing of the removable panel system, suitable methods and materials are described above. All publications, patent applications, patents, and other references mentioned herein are incorporated by reference in their entirety to the extent allowed by applicable law and regulations. The removable panel system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A removable vehicle panel system, comprising:
   a vehicle including a frame defining a cab;
   a roof panel removably connected to the frame;
   a door panel removably connected to the frame;
   a door receiver panel removably connected to the frame, wherein the door receiver panel comprises a buckle receiver, wherein the roof panel comprises a connection buckle, wherein the connection buckle is adapted to removably connect to the buckle receiver; and
   a windshield panel removably connected to the frame.

2. The removable vehicle panel system of claim 1, wherein the vehicle comprises an all-terrain vehicle.

3. The removable vehicle panel system of claim 1, wherein the roof panel comprises a pair of connection straps which extend downwardly from the roof panel, wherein the pair of connection straps are adapted to removably connect the roof panel to the frame.

4. The removable vehicle panel system of claim 3, wherein the roof panel comprises a fastener adapted to removably connect the roof panel to the frame.

5. The removable vehicle panel system of claim 4, wherein the fastener comprises an adhesive strip of hook-and-loop fastener.

6. The removable vehicle panel system of claim 4, wherein the roof panel comprises a plurality of button connectors adapted to removably connect the roof panel to the frame.

7. The removable vehicle panel system of claim 1, wherein the roof panel comprises a rear window extension which is adapted to cover a rear end of the frame.

8. The removable vehicle panel system of claim 7, wherein the rear window extension comprises a removable rear window panel.

9. The removable vehicle panel system of claim 1, wherein the door panel is hingedly connected to the frame.

10. The removable vehicle panel system of claim 9, wherein the door panel comprises a hinge pin, wherein the frame comprises a hinge receiver, wherein the hinge pin is adapted to removably engage with the hinge receiver.

11. The removable vehicle panel system of claim 1, wherein the door panel is hingedly connected to the door receiver panel.

12. The removable vehicle panel system of claim 11, wherein the door receiver panel comprises a hinge receiver, wherein the door panel comprises a hinge pin, wherein the hinge pin is adapted to removably engage with the hinge receiver.

13. The removable vehicle panel system of claim 1, wherein the door receiver panel comprises a bolt opening for receiving a bolt to connect the door receiver panel to the frame.

14. The removable vehicle panel system of claim 1, wherein the windshield panel comprises a connector strap for removably connecting the windshield panel to the frame.

* * * * *